US012658651B2

(12) United States Patent
Huang et al.

(10) Patent No.: US 12,658,651 B2
(45) Date of Patent: Jun. 16, 2026

(54) ELECTRICAL CONNECTOR AND CONNECTOR ASSEMBLY THEREOF WITH IMPROVED ISOLATION SHIELDING PLATE

(71) Applicant: DONGGUAN LUXSHARE TECHNOLOGIES CO., LTD, Dongguan City (CN)

(72) Inventors: Bin Huang, Dongguan City (CN); Chenhui Zeng, Dongguan City (CN); Kunlin Yao, Dongguan City (CN); Qiongnan Chen, Dongguan City (CN); Hongji Chen, Dongguan City (CN); Cheng Li, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 354 days.

(21) Appl. No.: 18/532,523

(22) Filed: Dec. 7, 2023

(65) Prior Publication Data

US 2025/0112414 A1 Apr. 3, 2025

(30) Foreign Application Priority Data

Sep. 28, 2023 (CN) ........................ 202311287173.1

(51) Int. Cl.
*H01R 13/6585* (2011.01)
*H01R 13/42* (2006.01)
(Continued)

(52) U.S. Cl.
CPC ......... *H01R 13/6585* (2013.01); *H01R 13/42* (2013.01); *H01R 13/6461* (2013.01);
(Continued)

(58) Field of Classification Search
CPC ............ H01R 13/6582; H01R 13/6581; H01R 13/6461; H01R 13/6585; H01R 12/716; H01R 12/721
(Continued)

(56) References Cited

U.S. PATENT DOCUMENTS 4,703,986 A * 11/1987 McCormick ......... H01R 13/633 439/607.52
6,361,373 B1 3/2002 Horchler
(Continued)

FOREIGN PATENT DOCUMENTS

CN 1663081 A 8/2005
CN 2796175 Y 7/2006
(Continued)

OTHER PUBLICATIONS

U.S. Notice of Allowance for U.S. Appl. No. 18/530,868, dated Feb. 9, 2026.
(Continued)

*Primary Examiner* — Marcus E Harcum
(74) *Attorney, Agent, or Firm* — Birch, Stewart, Kolasch & Birch, LLP

(57) ABSTRACT

An electrical connector includes a housing, a first terminal module, a second terminal module and an isolation shielding plate. The housing includes a receiving slot, a first terminal module installation slot and a second terminal module installation slot. The first terminal module is partially received in the first terminal module installation slot. The first terminal module includes a first conductive terminal. The second terminal module is partially received in the second terminal module installation slot. The second terminal module includes a second conductive terminal. The isolation shielding plate is located between the first conductive terminal and the second conductive terminal. The iso-
(Continued)

lation shielding plate is configured to move back and forth along a first direction to adjust the shielding position. A connector assembly having the electrical connector is also disclosed.

18 Claims, 20 Drawing Sheets

(51) Int. Cl.
*H01R 13/6461* (2011.01)
*H01R 13/6581* (2011.01)
*H01R 13/502* (2006.01)
*H01R 13/6587* (2011.01)

(52) U.S. Cl.
CPC ....... *H01R 13/6581* (2013.01); *H01R 13/502* (2013.01); *H01R 13/6587* (2013.01)

(58) Field of Classification Search
USPC ............... 439/59, 660, 637, 108, 607.07, 62
See application file for complete search history.

(56) References Cited

U.S. PATENT DOCUMENTS 7,128,588 B2* 10/2006 Hu ..................... H01R 13/6275 439/159
7,297,024 B2 11/2007 Ni et al.
8,858,237 B2 10/2014 Hsu et al.
9,350,121 B2 5/2016 Ju et al.
9,401,570 B2 7/2016 Phillips et al.
9,450,355 B2* 9/2016 Zhang .................... H01R 24/60
9,461,378 B1 10/2016 Chen
9,478,889 B2* 10/2016 Oshida ............... H01R 13/6585
9,509,098 B1 11/2016 Henry et al.
9,799,994 B2 10/2017 Chen
9,812,823 B2 11/2017 Kawakami et al.
9,972,945 B1 5/2018 Huang et al.
10,050,365 B1 8/2018 Ju
10,103,501 B2 10/2018 Lin et al.
10,276,983 B2* 4/2019 Arai ....................... H01R 43/24
10,714,877 B2 7/2020 Zhou
10,763,624 B1 9/2020 Henry et al.
11,031,708 B2 6/2021 Teh
11,108,194 B2 8/2021 Lin et al.
11,189,972 B2 11/2021 Casher et al.
11,196,220 B2 12/2021 Tu et al.
11,283,221 B2 3/2022 Hsueh et al.
11,749,947 B2 9/2023 Huang et al.
11,984,680 B2 5/2024 Fan et al.
12,294,187 B2 5/2025 Liu et al.
2002/0115318 A1 8/2002 Apicelli
2003/0143894 A1 7/2003 Kline et al.
2003/0180011 A1 9/2003 Aronson
2006/0270254 A1* 11/2006 Chiang ............. H01R 13/4538 439/137
2009/0305574 A1 12/2009 Chen et al.
2010/0210139 A1 8/2010 Wei
2011/0009001 A1 1/2011 Chen et al.
2013/0189858 A1 7/2013 Johnescu et al.
2013/0303005 A1* 11/2013 Chiba ................ H01R 13/6596 439/108
2014/0024257 A1 1/2014 Castillo et al.
2014/0273585 A1 9/2014 Dang
2015/0004839 A1 1/2015 Wang et al.
2015/0111401 A1* 4/2015 Guo .................. H01R 13/6594 439/95
2016/0043511 A1 2/2016 Hsu
2016/0181734 A1 6/2016 Kao et al.
2017/0033482 A1 2/2017 Liao
2017/0033506 A1* 2/2017 Hsu .................... H01R 13/6585
2017/0070013 A1 3/2017 Hsu et al.
2017/0207581 A1 7/2017 Zhang
2017/0352992 A1 12/2017 Lin et al.
2017/0358885 A1 12/2017 Okuyama et al.
2018/0294592 A1 10/2018 Huang et al.
2019/0131745 A1 5/2019 Zhao et al.
2019/0199028 A1 6/2019 Maesoba et al.
2019/0221972 A1 7/2019 Hou et al.
2019/0393634 A1 12/2019 Kao et al.
2020/0091635 A1 3/2020 Horii
2020/0176937 A1 6/2020 Azad
2020/0235535 A1 7/2020 Tsai et al.
2020/0303854 A1 9/2020 Jin
2020/0335890 A1 10/2020 Liu et al.
2020/0343661 A1 10/2020 Wu et al.
2020/0412067 A1 12/2020 Xu et al.
2021/0075143 A1 3/2021 Laurx et al.
2021/0075164 A1 3/2021 Chen et al.
2021/0194187 A1 6/2021 Chen et al.
2021/0203107 A1 7/2021 Liu et al.
2021/0203108 A1 7/2021 Liu et al.
2021/0296831 A1* 9/2021 Wu ........................ H01R 13/40
2021/0336386 A1 10/2021 Wu et al.
2021/0399498 A1 12/2021 Liu et al.
2022/0006217 A1 1/2022 Huang et al.
2022/0052469 A1 2/2022 Huang et al.
2022/0052492 A1 2/2022 Guo et al.
2022/0115818 A1 4/2022 Little et al.
2022/0216652 A1 7/2022 Chen et al.
2022/0224054 A1 7/2022 Xu et al.
2022/0352667 A1 11/2022 Chen et al.
2023/0128860 A1 4/2023 Liu et al.
2023/0144251 A1 5/2023 Lee et al.
2023/0216248 A1 7/2023 Huang et al.
2023/0238723 A1 7/2023 Chen et al.
2023/0261425 A1 8/2023 Sun
2023/0283025 A1 9/2023 Lin et al.
2023/0318213 A1 10/2023 Lu
2023/0335934 A1 10/2023 Fu et al.
2023/0420882 A1 12/2023 Hsu et al.
2024/0030658 A1 1/2024 Little
2024/0063564 A1 2/2024 Hsu et al.
2024/0178620 A1 5/2024 Li et al.
2024/0235120 A1* 7/2024 Chen ...................... H01R 13/42
2024/0305027 A1 9/2024 Xiao et al.
2024/0313476 A1 9/2024 Tuin et al.
2024/0347955 A1 10/2024 Huang et al.
2024/0347983 A1* 10/2024 Liu ........................ H01R 13/42
2024/0364057 A1 10/2024 Zhu et al.
2024/0413587 A1* 12/2024 Eroglu ................ F16L 37/0926
2024/0429659 A1 12/2024 Wu et al.
2025/0047042 A1 2/2025 Zhang et al.
2025/0055230 A1* 2/2025 Shioda ................. H01R 12/716
2025/0055232 A1* 2/2025 Shioda ................... H01R 12/73
2025/0079735 A1 3/2025 Little

FOREIGN PATENT DOCUMENTS

CN 2891330 Y 4/2007
CN 101453088 A 6/2009
CN 201374459 Y 12/2009
CN 101847800 A 9/2010
CN 201797172 U 4/2011
CN 102170077 A 8/2011
CN 102315560 A 1/2012
CN 102646878 A 8/2012
CN 103296537 A 9/2013
CN 203192962 U 9/2013
CN 203326218 U 12/2013
CN 103579835 A 2/2014
CN 104882691 A 9/2015
CN 105428860 A 3/2016
CN 105789963 A 7/2016
CN 106981762 A 7/2017
CN 107658593 A 2/2018
CN 108493716 A 9/2018
CN 207938913 U 10/2018
CN 108832338 A 11/2018
CN 208062264 U 11/2018
CN 208299135 U 12/2018
CN 110061391 A 7/2019
CN 209592385 U 11/2019

(56) References Cited

FOREIGN PATENT DOCUMENTS

| | | | |
|---|---|---|---|
| CN | 110752486 | A | 2/2020 |
| CN | 111048925 | A | 4/2020 |
| CN | 210430167 | U | 4/2020 |
| CN | 111106478 | A | 5/2020 |
| CN | 107026350 | B | 7/2020 |
| CN | 111641067 | A | 9/2020 |
| CN | 111682366 | A | 9/2020 |
| CN | 111864476 | A | 10/2020 |
| CN | 211957991 | U | 11/2020 |
| CN | 112038803 | A | 12/2020 |
| CN | 112117604 | A | 12/2020 |
| CN | 212412336 | U | 1/2021 |
| CN | 212725822 | U | 3/2021 |
| CN | 213151158 | U | 5/2021 |
| CN | 112886340 | A | 6/2021 |
| CN | 214100121 | U | 8/2021 |
| CN | 214478000 | U | 10/2021 |
| CN | 214478259 | U | 10/2021 |
| CN | 113629429 | A | 11/2021 |
| CN | 215579364 | U | 1/2022 |
| CN | 216120839 | U | 3/2022 |
| CN | 114784552 | A | 7/2022 |
| CN | 217239821 | U | 8/2022 |
| CN | 115117696 | A | 9/2022 |
| CN | 218123877 | U | 12/2022 |
| CN | 115764382 | A | 3/2023 |
| CN | 218677857 | U | 3/2023 |
| CN | 116207537 | A | 6/2023 |
| CN | 219436197 | U | 7/2023 |
| CN | 116526192 | A | 8/2023 |
| CN | 116544691 | A | 8/2023 |
| CN | 116667063 | A | 8/2023 |
| CN | 220673019 | U | 3/2024 |
| EP | 0 436 943 | A1 | 7/1991 |
| JP | 2000-67958 | A | 3/2000 |
| JP | 2005-123163 | A | 5/2005 |
| JP | 3154945 | U | 10/2009 |
| JP | 2019-185880 | A | 10/2019 |
| JP | 3238050 | U | 6/2022 |
| KR | 2001-0082007 | A | 8/2001 |
| TW | M253973 | U | 12/2004 |
| TW | 200627723 | A | 8/2006 |
| TW | M531081 | U | 10/2016 |
| TW | M572092 | U | 12/2018 |
| TW | M601917 | U | 9/2020 |
| TW | I759140 | B | 3/2022 |
| TW | M629001 | U | 7/2022 |
| TW | M638656 | U | 3/2023 |
| TW | M643642 | U | 7/2023 |
| WO | WO 2022/171008 | A1 | 8/2022 |
| WO | WO 2023/119057 | A1 | 6/2023 |

OTHER PUBLICATIONS

U.S. Office Action for U.S. Appl. No. 18/532,101, dated Dec. 31, 2025.

U.S. Notice of Allowance for U.S. Appl. No. 18/532,315, dated Mar. 10, 2026.

U.S. Office Action for U.S. Appl. No. 18/531,326, dated Mar. 16, 2026.

U.S. Office Action for U.S. Appl. No. 18/530,656, dated Mar. 24, 2026.

U.S. Office Action for U.S. Appl. No. 18/532,350, dated Mar. 25, 2026.

U.S. Office Action for U.S. Appl. No. 18/532,495, dated Mar. 25, 2026.

U.S. Notice of Allowance for U.S. Appl. No. 18/532,782, dated Apr. 10, 2026.

U.S. Office Action for U.S. Appl. No. 18/532,081, dated Apr. 21, 2026.

* cited by examiner

ELECTRICAL CONNECTOR AND CONNECTOR ASSEMBLY THEREOF WITH IMPROVED ISOLATION SHIELDING PLATE

CROSS-REFERENCE TO RELATED APPLICATION

This patent application claims priority of a Chinese Patent Application No. 202311287173.1, filed on Sep. 28, 2023 and titled "ELECTRICAL CONNECTOR AND CONNECTOR ASSEMBLY THEREOF", the entire content of which is incorporated herein by reference.

TECHNICAL FIELD

The present disclosure relates to an electrical connector and a connector assembly, which belong to the technical field of connectors.

BACKGROUND

A connector assembly in the related art generally include an electrical connector and a mating module for mating with the electrical connector. The electrical connector generally includes an insulating housing, a first terminal module and a second terminal module. The first terminal module includes a plurality of first conductive terminals. The second terminal module includes a plurality of second conductive terminals. In order to reduce crosstalk between the first conductive terminals and the second conductive terminals, the electrical connector may further include a shielding plate.

However, the shielding plate is a fixed structure. When the mating module is inserted into the electrical connector, the mating module is in hard contact with the shielding plate, which causes wear and tear, and reduce the reliability of the connector assembly.

SUMMARY

An object of the present disclosure to provide an electrical connector and a connector assembly thereof with an improved isolation shielding plate.

In order to achieve the above object, the present disclosure adopts the following technical solution: an electrical connector, including: a housing, the housing defining a receiving slot configured to at least partially receive a mating module along a first direction, a first terminal module installation slot communicating with the receiving slot, and a second terminal module installation slot communicating with the receiving slot; a first terminal module, the first terminal module being partially received in the first terminal module installation slot; the first terminal module including a plurality of first conductive terminals; each first conductive terminal including a first fixing portion and a first contact arm connected to the first fixing portion; the first contact arm including a first contact portion protruding into the receiving slot; a second terminal module, the second terminal module being partially received in the second terminal module installation slot; the second terminal module including a plurality of second conductive terminals; each second conductive terminal including a third fixing portion and a second contact arm connected to the third fixing portion; the second contact arm including a second contact portion protruding into the receiving slot; and an isolation shielding plate, the isolation shielding plate being located between the first conductive terminals and the second conductive terminals; the isolation shielding plate being configured to move back and forth along the first direction.

In order to achieve the above object, the present disclosure adopts the following technical solution: a connector assembly, including a mating module and an electrical connector mating with the mating module; the mating module including a tongue plate; the tongue plate including an upper surface, a lower surface, a mating end surface, a plurality of first contact pads exposed to the upper surface, a plurality of second contact pads exposed to the lower surface, and a grounding bar exposed to the mating end surface; the electrical connector including: a housing, the housing defining a receiving slot configured to at least partially receive a mating module along a first direction, a first terminal module installation slot communicating with the receiving slot, and a second terminal module installation slot communicating with the receiving slot; a first terminal module, the first terminal module being partially received in the first terminal module installation slot; the first terminal module including a plurality of first conductive terminals; each first conductive terminal including a first fixing portion and a first contact arm connected to the first fixing portion; the first contact arm including a first contact portion protruding into the receiving slot; a second terminal module, the second terminal module being partially received in the second terminal module installation slot; the second terminal module including a plurality of second conductive terminals; each second conductive terminal including a third fixing portion and a second contact arm connected to the third fixing portion; the second contact arm including a second contact portion protruding into the receiving slot; and an isolation shielding plate, the isolation shielding plate being located between the first conductive terminals and the second conductive terminals; the isolation shielding plate being configured to move back and forth along the first direction; when the tongue plate is inserted into the receiving slot, the first contact portion of the first conductive terminal contacts a corresponding first contact pad; the second contact portion of the second conductive terminal contacts a corresponding second contact pad; the grounding bar abuts against the isolation shielding plate along the first direction.

Compared with the prior art, the isolation shielding plate of the present disclosure is configured to move back and forth along the first direction, which facilitates adjustment of the shielding position and reduces hard interference with the mating module, thereby improving product reliability.

DETAILED DESCRIPTION

Figure 1:
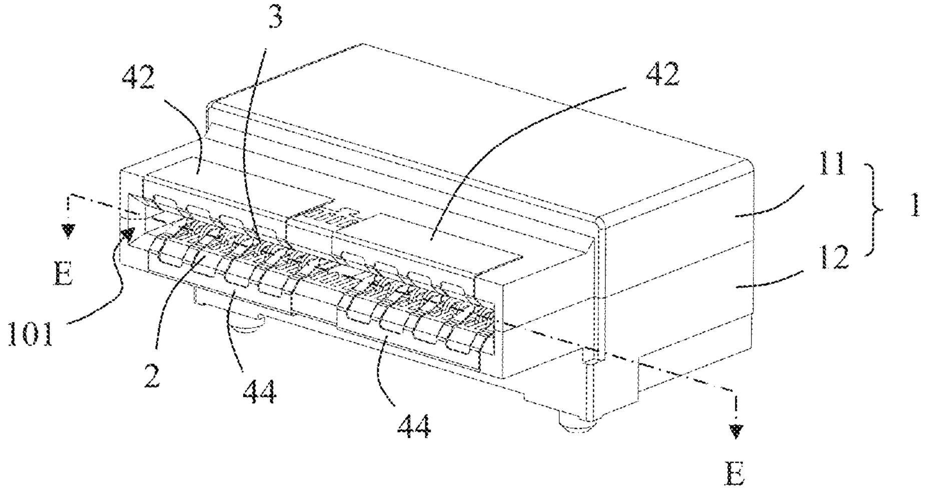
FIG. 1 is a schematic perspective view of an electrical connector in accordance with an embodiment of the present disclosure.
Figure 2:
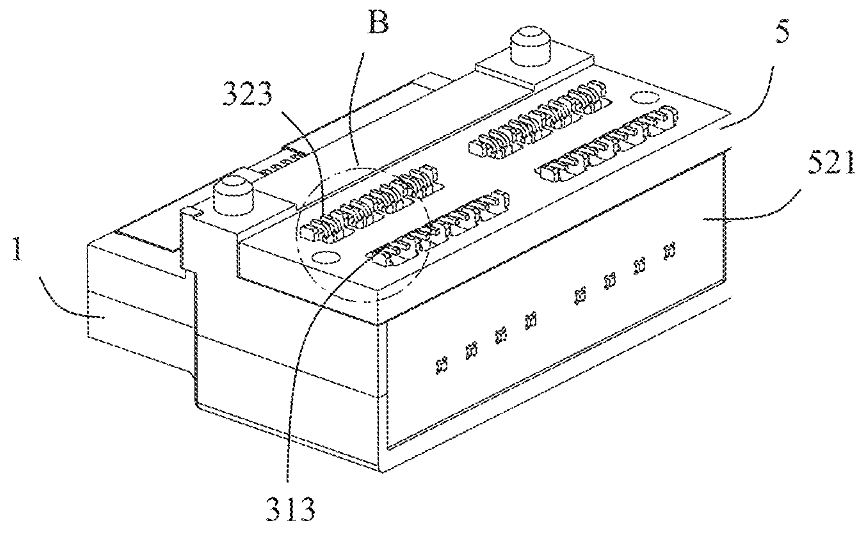
FIG. 2 is a perspective view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 4, the present disclosure discloses a connector assembly 400 including an electrical connector 100, a circuit board (not shown) for mounting the electrical connector 100, and a mating module 300 configured to be at least partially inserted into the electrical connector 100. In the illustrated embodiment of the present disclosure, the electrical connector 100 is an OSFP (Octal Small Form-factor Pluggable) receptacle connector. Correspondingly, the mating module 300 is an OSFP plug connector. Of course, it is understandable to those skilled in the art that the electrical connector 100 can also be an SFP (Small Form-factor Pluggable) receptacle connector, a QSFP (Quad Small Form-factor Pluggable) receptacle connector, a QSFP-DD (Quad Small Form-factor Pluggable-Double Density) receptacle connector, an SFP-DD (Small Form-factor Pluggable-Double Density) receptacle connector or a DSFP (Dual Chanel Small Form-factor Pluggable) receptacle connector, etc. Correspondingly, the mating module 300 is an SFP plug connector, a QSFP plug connector, a QSFP-DD plug connector, an SFP-DD plug connector or a DSFP plug connector, etc. It is understandable to those skilled in the art that the basic structure of the above types of the electrical connectors is regulated by corresponding association standards, and will not be described in detail here.

In the illustrated embodiment of the present disclosure, the electrical connector 100 defines a receiving slot 101 for at least partially receiving the mating module 300. To simplify the description of the specific embodiments of the present disclosure, an insertion and extraction direction of the mating module 300 and the electrical connector 100 is a first direction A1-A1 (for example, a front-rear direction); a width direction of the receiving slot 101 is a second direction A2-A2 (for example, a left-right direction); an installation direction of the electrical connector 100 and the circuit board is a third direction A3-A3 (for example, a top-bottom direction). Each two of the first direction A1-A1, the second direction A2-A2 and the third direction A3-A3 are perpendicular to each other.

Figure 3:
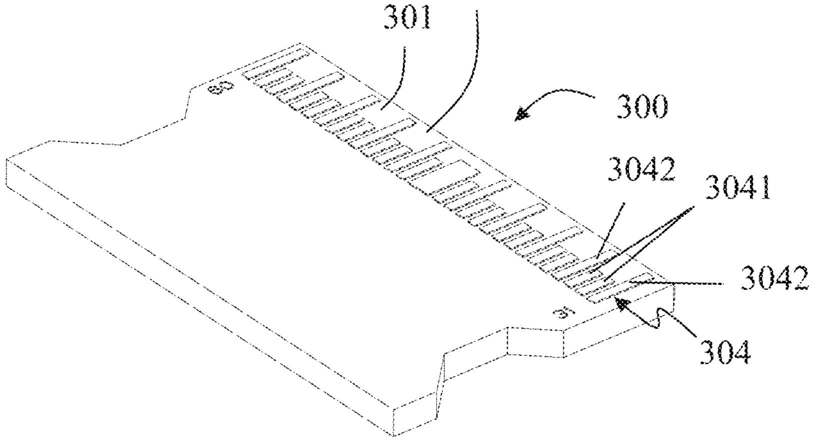
FIG. 3 is a perspective view of a mating module inserted into the electrical connector of the present disclosure.
Figure 4:
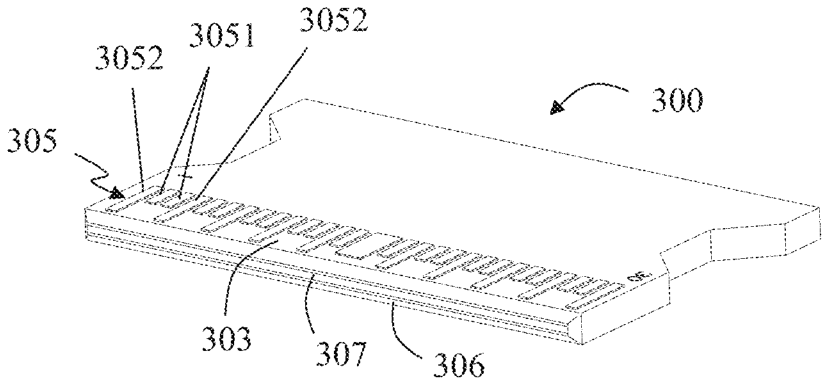
FIG. 4 is a perspective view of FIG. 3 from another angle.

As shown in FIG. 3 and FIG. 4, the mating module 300 includes a tongue plate 301. The tongue plate 301 includes an upper surface 302, a lower surface 303, a plurality of first contact pads 304 exposed to the upper surface 302, and a plurality of second contact pads 305 exposed to the lower surface 303. The plurality of first contact pads 304 are disposed at intervals along the second direction A2-A2. The plurality of second contact pads 305 are disposed at intervals along the second direction A2-A2.

Specifically, in the illustrated embodiment of the present disclosure, the plurality of first contact pads 304 include a plurality of first signal contact pads 3041 and a plurality of first ground contact pads 3042. The plurality of first signal contact pads 3041 are divided into a plurality of groups, in which each group includes two first signal contact pads 3041 adjacently arranged along the second direction A2-A2. Each group of first signal contact pads 3041 is associated with two first ground contact pads 3042 which are located on two sides thereof respectively, so as to improve shielding and improve signal transmission quality. In the illustrated embodiment of the present disclosure, each group of first signal contact pads 3041 forms a differential pair to increase the speed of signal transmission. In the illustrated embodiment of the present disclosure, a length of each first ground contact pad 3042 along the first direction A1-A1 is greater than a length of each first signal contact pad 3041 along the first direction A1-A1, so as to better improve the shielding and improve the signal transmission quality.

Similarly, in the illustrated embodiment of the present disclosure, the plurality of second contact pads 305 include a plurality of second signal contact pads 3051 and a plurality of second ground contact pads 3052. The plurality of second signal contact pads 3051 are divided into a plurality of groups, in which each group includes two second signal contact pads 3051 adjacently arranged along the second direction A2-A2. Each group of second signal contact pads 3051 is associated with two second ground contact pads 3052 which are located on two sides thereof respectively, so as to improve shielding and improve signal transmission quality. In the illustrated embodiment of the present disclosure, each group of second signal contact pads 3051 forms a differential pair to increase the speed of signal transmission. In the illustrated embodiment of the present disclosure, a length of each second ground contact pad 3052 along the first direction A1-A1 is greater than a length of each second signal contact pad 3051 along the first direction A1-A1, so as to better improve the shielding and improve the signal transmission quality.

In addition, in the illustrated embodiment of the present disclosure, the tongue plate 301 further includes a mating end surface 306 and a grounding bar 307 at least partially exposed to the mating end surface 306.

Referring to FIGS. 6 to 23, in one embodiment of the present disclosure, the electrical connector 100 includes a housing, an insulating fixing block 2 fixed to the housing, and a plurality of conductive terminals 3 installed to the housing.

In an embodiment of the present disclosure, the housing is a conductive housing 1. The conductive housing 1 is a metal housing made of metal material so as to further improve the shielding effect and improve the quality of signal transmission. In another embodiment of the present disclosure, the conductive housing 1 may also be a composite housing formed by electroplating a metal material on an insulating material. The composite housing can also improve the shielding effect and improve the quality of signal transmission.

The housing includes a first housing and a second housing. Referring to FIG. 6 to FIG. 18, in one embodiment of the present disclosure, the first housing is a first conductive housing 11; and the second housing is a second conductive housing 12. The first conductive housing 11 and the second conductive housing 12 are fixed together. For example, after the first conductive housing 11 and the second conductive housing 12 are assembled, they are fixed together by welding or soldering or other methods.

In an embodiment of the present disclosure, the first conductive housing 11 includes a first upper surface 1111, a first lower surface 1112, a first rear surface 1115 and a first mounting groove 1116 recessed forwardly from the first rear surface 1115. The first mounting groove 1116 extends downwardly through the first lower surface 1112. The first conductive housing 11 further includes at least one first recess 1118 located on the first lower surface 1112. In the illustrated embodiment of the present disclosure, two first recesses 1118 are provided. The first conductive housing 11 further includes a plurality of first filling grooves 1123.

Figure 15:
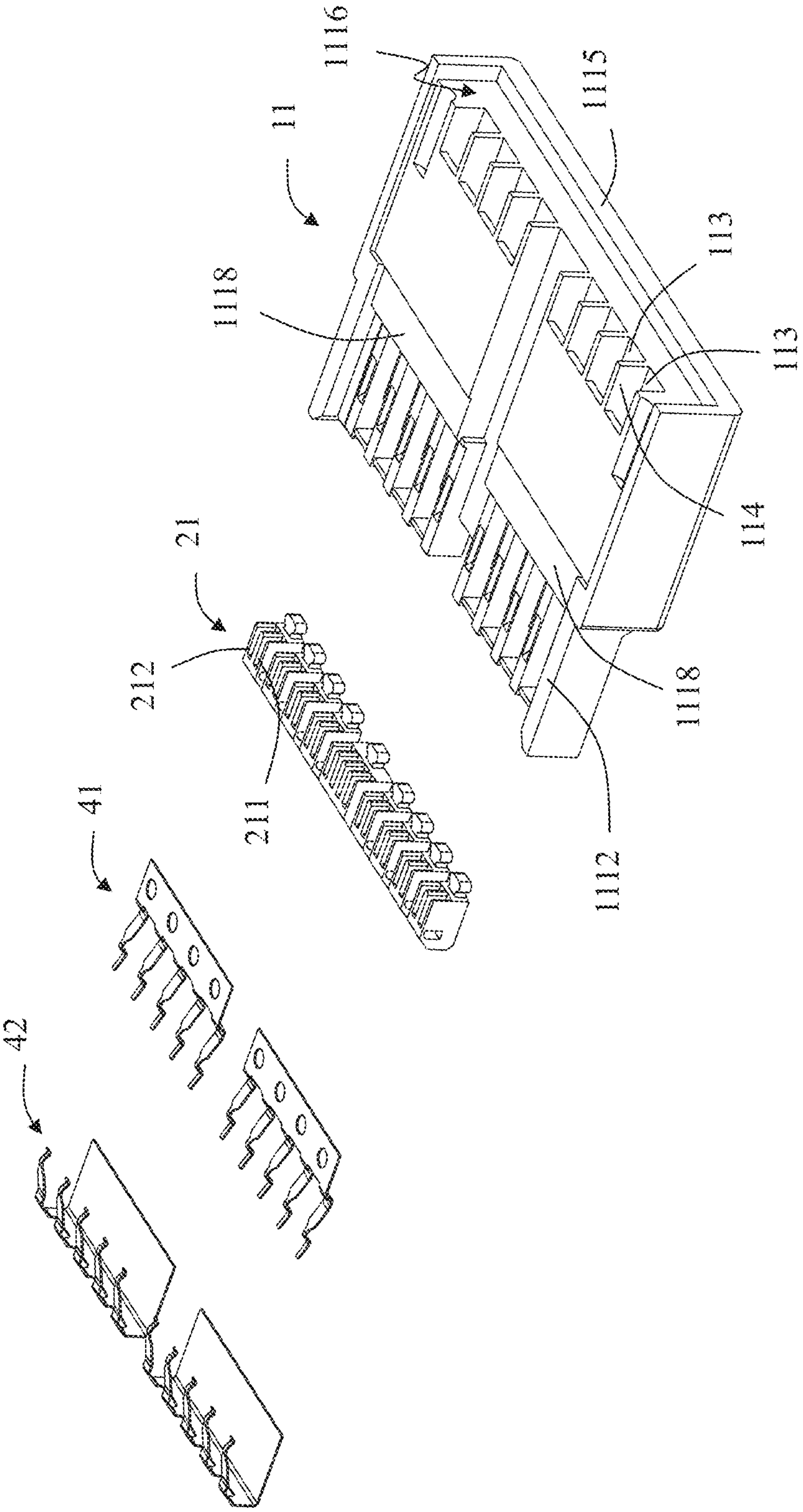
FIG. 15 is an exploded perspective view of FIG. 14 from another angle.
Figure 16:
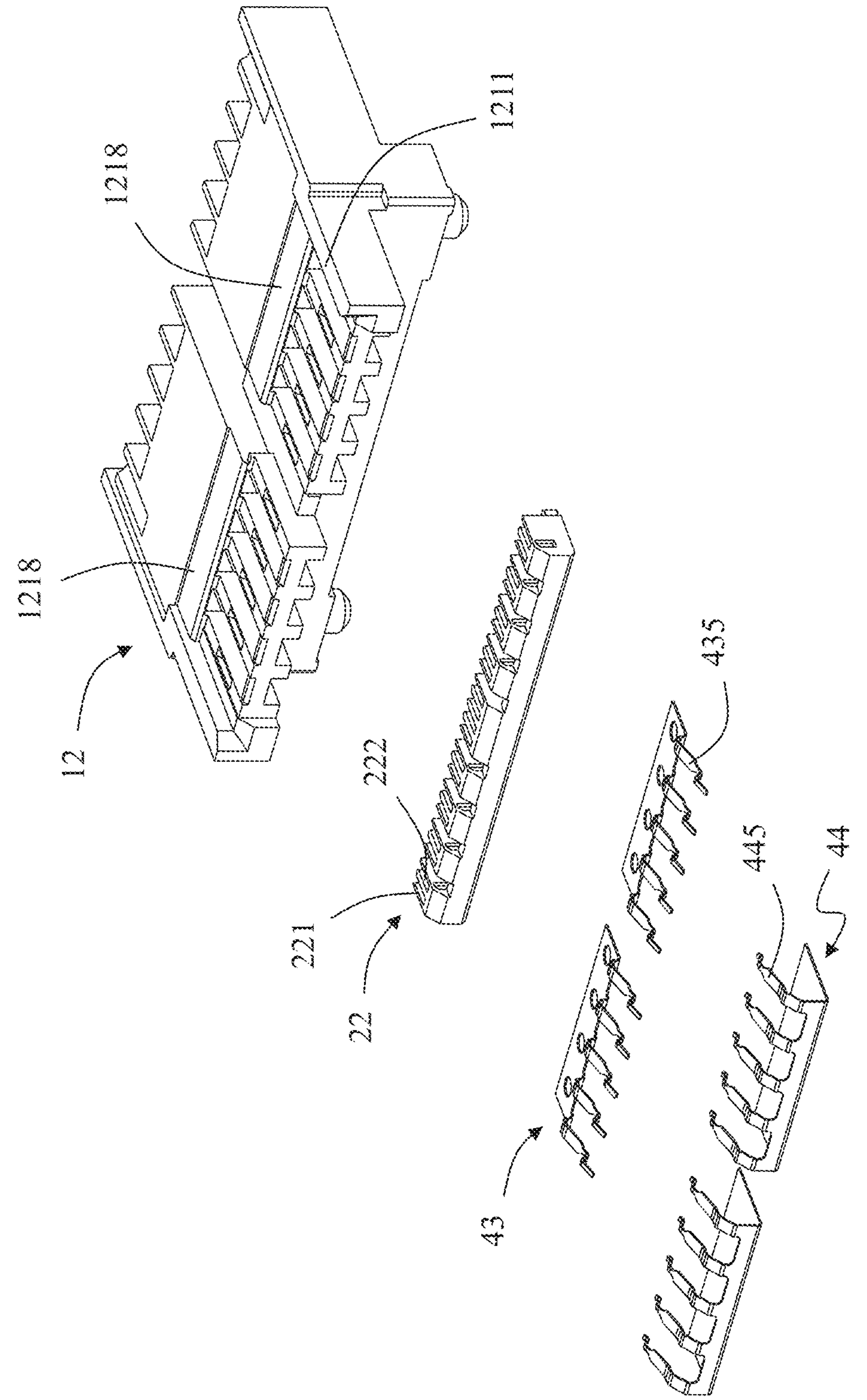
FIG. 16 is an exploded perspective view of a third ground sheet, a fourth ground sheet, a second insulating fixing block and a second conductive housing.

Referring to FIG. 15, in the illustrated embodiment of the present disclosure, the first conductive housing 11 further includes a plurality of first terminal module installation slots 113 extending along the first direction A1-A1. A rear end of the first terminal module installation slot 113 communicates with the first mounting groove 1116. A middle portion of the first terminal module installation slot 113 is circumferentially surrounded by walls of the first conductive housing 11. It is understandable to those skilled in the art that by arranging the middle portion of the first terminal module installation slot 113 to be surrounded by the walls of the first conductive housing 11 in a circumferential direction, on the one hand, the conductive terminals located in the first terminal module installation slots 113 can be better shielded; and on the other hand, adjacent first terminal module installation slots 113 can be well separated, thereby reducing signal crosstalk.

The plurality of first terminal module installation slots 113 are spaced apart along the second direction A2-A2. The first conductive housing 11 includes a plurality of first partition walls 114 disposed at intervals along the second direction A2-A2. Two adjacent first terminal module installation slots 113 are separated by a corresponding first partition wall 114 along the second direction A2-A2. With this arrangement, each first terminal module installation slot 113 is relatively independent, thereby reducing signal crosstalk and improving the quality of data transmission.

In an embodiment of the present disclosure, the second conductive housing 12 includes a second upper surface 1211, a second lower surface 1212, and a second rear surface 1215. The second conductive housing 12 further includes at least one second recess 1218 located on the second upper surface 1211. In the illustrated embodiment of the present disclosure, two second recesses 1218 are provided. The second conductive housing 12 further includes a plurality of second filling grooves 1223.

Figure 17:
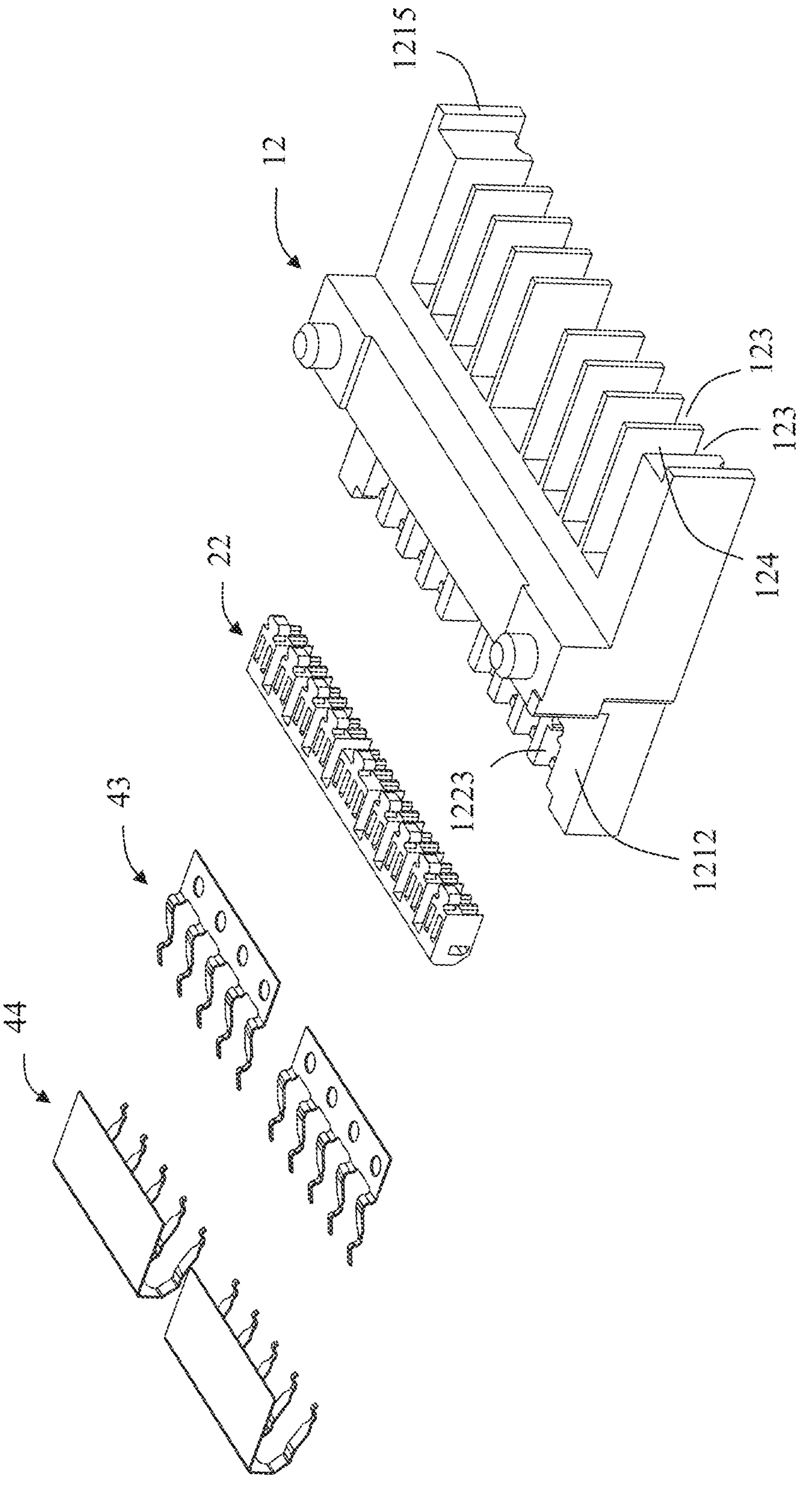
FIG. 17 is an exploded perspective view of FIG. 16 from another angle.
Figure 18:
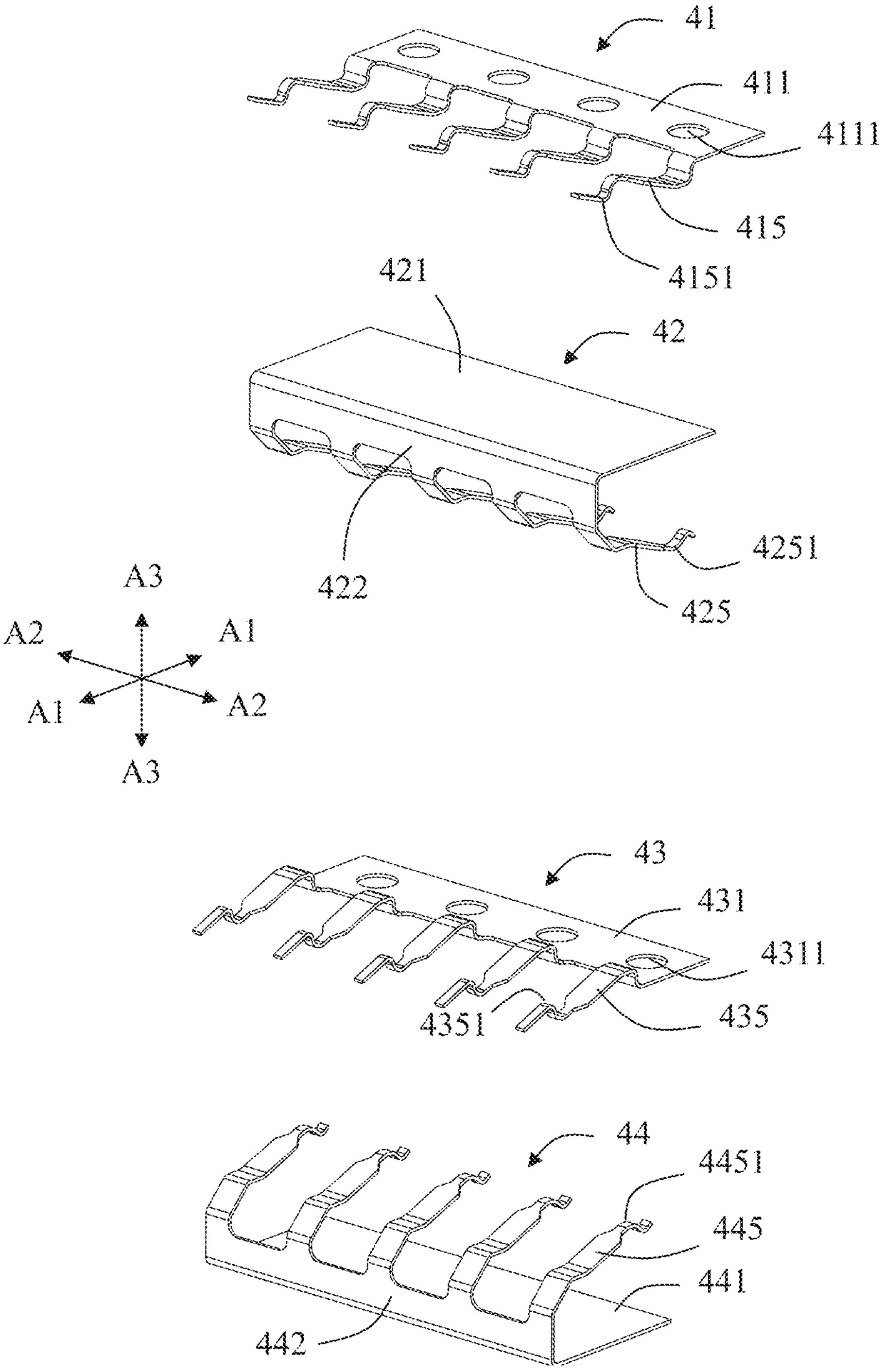
FIG. 18 is a perspective view of the first ground sheet, the second ground sheet, the third ground sheet and the fourth ground sheet.

Referring to FIG. 17, in the illustrated embodiment of the present disclosure, the second conductive housing 12 further includes a plurality of second terminal module installation slots 123 extending along the first direction A1-A1. The middle portion of the second terminal module installation slot 123 is circumferentially surrounded by walls of the second conductive housing 12. It is understandable to those skilled in the art that by arranging the middle portion of the second terminal module installation slot 123 to be surrounded by the walls of the second conductive housing 12 in a circumferential direction; on the one hand, the conductive terminals located in the second terminal module installation slots 123 can be better shielded; and on the other hand, the adjacent second terminal module installation slots 123 can be well separated, thereby reducing signal crosstalk.

The plurality of second terminal module installation slots 123 are arranged at intervals along the second direction A2-A2. The second conductive housing 12 includes a plurality of second partition walls 124 disposed at intervals along the second direction A2-A2. Two adjacent second terminal module installation slots 123 are separated by corresponding second partition walls 124 along the second direction A2-A2. With this arrangement, each second terminal module installation slot 123 is relatively independent, thereby reducing signal crosstalk and improving the quality of data transmission.

Referring to FIG. 14 to FIG. 17, in the illustrated embodiment of the present disclosure, the insulating fixing block 2 includes a first insulating fixing block 21 and a second insulating fixing block 22. The first insulating fixing block 21 is fixed in the first filling grooves 1123. The second insulating fixing block 22 is fixed in the second filling grooves 1223. Preferably, in order to increase the bonding force between the first insulating fixing block 21 and the first conductive housing 11, the first insulating fixing block 21 is over-molded in the first filling grooves 1123. Similarly, in order to increase the bonding force between the second insulating fixing block 22 and the second conductive housing 12, the second insulating fixing block 22 is over-molded in the second filling grooves 1223.

The first insulating fixing block 21 defines a plurality of first slits 211 and a plurality of second slits 212, in which adjacent first slit 211 and second slit 212 form a group and communicate with a corresponding first terminal module installation slot 113.

Similarly, the second insulating fixing block 22 defines a plurality of third slits 221 and a plurality of fourth slits 222. Adjacent third slit 221 and fourth slit 222 form a group and communicate with a corresponding second terminal module installation slot 123.

Figure 19:
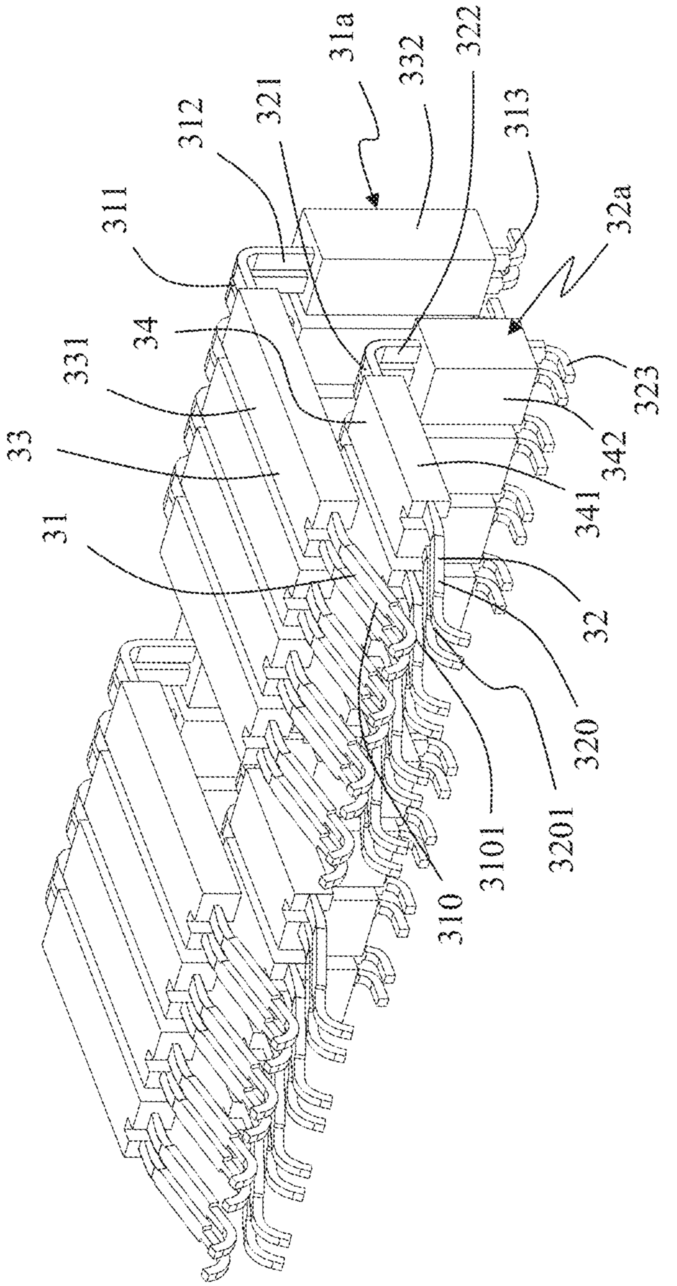
FIG. 19 is a perspective view of a first terminal module and a second terminal module.
Figure 20:
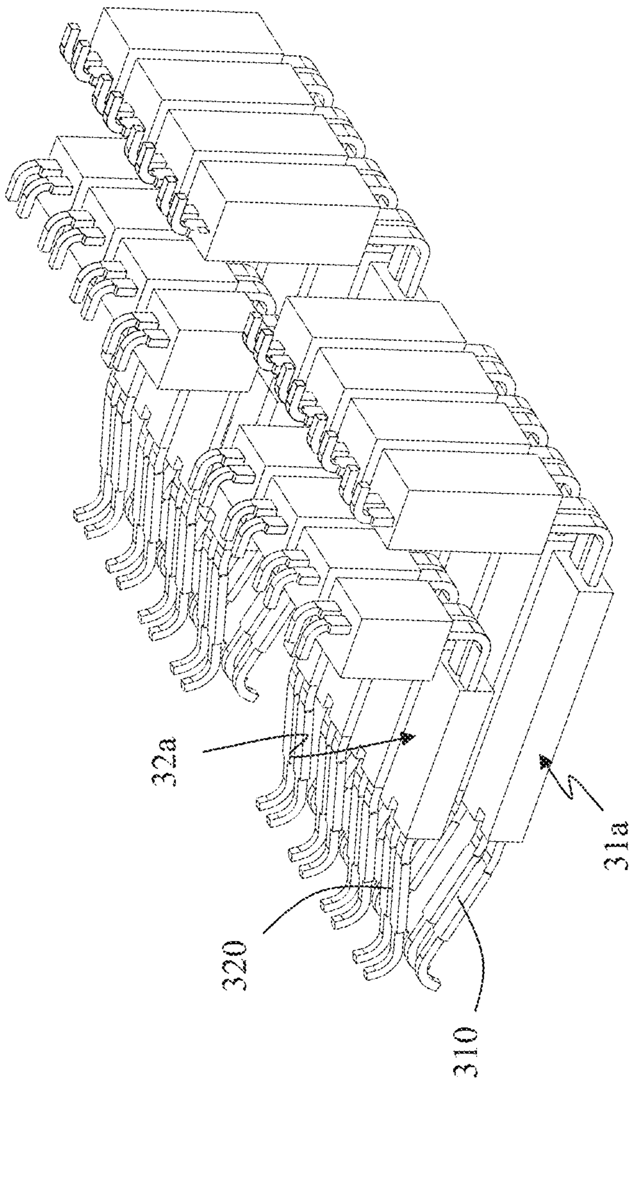
FIG. 20 is a perspective view of FIG. 19 from another angle.

As shown in FIG. 19 and FIG. 20, the plurality of conductive terminals 3 include a plurality of first conductive terminals 31 and a plurality of second conductive terminals 32. Each first conductive terminal 31 includes a first fixing portion 311 extending along the first direction A1-A1, a first contact arm 310 extending forwardly from a front end of the first fixing portion 311, a second fixing portion 312 bent downwardly from a rear end of the first fixing portion 311, and a first mounting foot 313 extending from a bottom end of the second fixing portion 312. The first contact arm 310 includes a first contact portion 3101 that protrudes into the receiving slot 101 to electrically contact the tongue plate 301. In the illustrated embodiment of the present disclosure, the first mounting foot 313 horizontally extends backwardly from the bottom end of the second fixing portion 312, so as to be in contact with the circuit board. It is understandable to those skilled in the art that in the illustrated embodiment of the present disclosure, the first mounting feet 313 may be fixed to the circuit board through SMT. Of course, in other embodiments, the first mounting feet 313 may also be disposed perpendicular to the circuit board. At this time, the circuit board defines a plurality of through holes, and the first mounting feet 313 extend through the through holes to be fixed to the circuit board by soldering or welding. In other embodiments, the first mounting feet 313 may also be disposed perpendicular to the circuit board. Each first mounting foot 313 defines a fisheye hole to provide a certain degree of elasticity. At this time, the circuit board defines a plurality of conductive through holes, and the first mounting feet 313 can be fixed to the circuit board through press-fit. The installation method of the first mounting feet 313 and the circuit board can be understood by those skilled in the art, and will not be described in detail here.

In the illustrated embodiment of the present disclosure, the plurality of first conductive terminals 31 are divided into a plurality of groups. Each group of first conductive terminals 31 includes a first signal terminal S1 and a second signal terminal S2 located adjacent to the first signal terminal S1. Preferably, the first signal terminal S1 and the second signal terminal S2 in each group of first conductive terminals 31 form a differential pair to improve signal transmission speed.

In the illustrated embodiment of the present disclosure, the electrical connector 100 further includes a first holding block 33 fixed on the first signal terminal S1 and the second signal terminal S2 of each group of first conductive terminals 31. In an embodiment of the present disclosure, the first signal terminal S1 and the second signal terminal S2 are insert-molded with the first holding block 33, so as to form an integrated first terminal module 31*a*. The first contact portions 3101 of the first signal terminal S1 and the second signal terminal S2 in each first terminal module 31*a* are configured to be in contact with the first signal contact pads 3041 of the mating module 300, respectively.

In the illustrated embodiment of the present disclosure, the first holding block 33 includes a first fixing block 331 fixed on the first fixing portions 311 of the first signal terminal S1 and the second signal terminal S2, and a second fixing block 332 fixed on the first fixing portions 311 of the first signal terminal S1 and the second signal terminal S2. The first fixing block 331 is received and fixed in the first terminal module installation slot 113 so that the first fixing portions 311 of the first signal terminal S1 and the second signal terminal S2 are arranged overhead in the first terminal module installation slot 113 to avoid contact with the first conductive housing 11.

Similarly, each second conductive terminal 32 includes a third fixing portion 321 extending along the first direction A1-A1, a second contact arm 320 extending forwardly from a front end of the third fixing portion 321, a fourth fixing portion 322 bent downwardly from a rear end of the third fixing portion 321, and a second mounting foot 323 extending from a bottom end of the fourth fixing portion 322. The second contact arm 320 includes a second contact portion 3201 protruding into the receiving slot 101 so as to contact the second signal contact pad 3051 of the tongue plate 301. In the illustrated embodiment of the present disclosure, the second mounting foot 323 horizontally extends forwardly from the bottom end of the fourth fixing portion 322, so as to electrically contact the circuit board. It is understandable to those skilled in the art that in the illustrated embodiment of the present disclosure, the second mounting feet 323 are soldered or welded to the circuit board by SMT. Of course, in other embodiments, the second mounting feet 323 can also be disposed perpendicular to the circuit board. At this time, the circuit board defines a plurality of through holes, and the second mounting feet 323 pass through the through holes to be soldered or welded to the circuit board. In other embodiments, the second mounting feet 323 may also be disposed perpendicular to the circuit board. Each second mounting foot 323 defines a fisheye hole to provide a certain degree of elasticity. At this time, the circuit board defines a plurality of conductive through holes. The second mounting feet 323 can be fixed to the circuit board through press-fit. The installation method of the second mounting feet 323 and the circuit board can be understood by those skilled in the art, and will not be described in detail here.

In the illustrated embodiment of the present disclosure, the plurality of second conductive terminals 32 are divided into a plurality of groups, and each group of second conductive terminals 32 includes a third signal terminal S3 and a fourth signal terminal S4 located adjacent to the third signal terminal S3. Preferably, the third signal terminal S3 and the fourth signal terminal S4 in each group of second conductive terminals 32 form a differential pair to improve signal transmission speed.

In the illustrated embodiment of the present disclosure, the electrical connector 100 further includes a second holding block 34 fixed on the third signal terminal S3 and the fourth signal terminal S4 of each group of second conductive terminals 32. In one embodiment of the present disclosure, the third signal terminal S3 and the fourth signal terminal S4 are insert-molded with the second holding block 34 to form an integrated second terminal module 32*a*. The second contact portions 3201 of the third signal terminal S3 and the fourth signal terminal S4 in each second terminal module 32*a* are configured to be in contact with the second signal contact pads 3051 of the mating module 300.

In the illustrated embodiment of the present disclosure, the second holding block 34 includes a third fixing block 341 fixed on the third fixing portions 321 of the third signal terminal S3 and the fourth signal terminal S4, and a fourth fixing block 342 fixed on the third fixing portions 321 of the third signal terminal S3 and the fourth signal terminal S4. The third fixing block 341 is received and fixed in the second terminal module installation slot 123 so that the third fixing portions 321 of the third signal terminal S3 and the fourth signal terminal S4 are arranged overhead in the second terminal module installation slot 123 to avoid contact with the second conductive housing 12.

Referring to FIGS. 12 to 18, in one embodiment of the present disclosure, the electrical connector 100 further includes at least one grounding sheet mounted to the conductive housing 1. In an embodiment of the present disclosure, the at least one ground sheet includes a first ground sheet 41, a second ground sheet 42, a third ground sheet 43 and a fourth ground sheet 44. In the illustrated embodiment of the present disclosure, two first ground sheets 41, two second ground sheets 42, two third ground sheets 43 and two fourth ground sheets 44 are provided, and each of them is made of metal material.

Each first ground sheet 41 includes a first mounting plate 411 and a plurality of first grounding elastic arms 415 integrally extending from the first mounting plate 411. In the illustrated embodiment of the present disclosure, the first mounting plate 411 is installed and fixed in the first recess 1118. The first mounting plate 411 defines a plurality of first through holes 4111 that extend through the first mounting plate 411 along the third direction A3-A3 to facilitate fixation with the first conductive housing 11 by welding or soldering. In the illustrated embodiment of the present disclosure, the plurality of first grounding elastic arms 415 are spaced apart along the second direction A2-A2. Each first grounding elastic arm 415 extends forwardly in a cantilevered manner along the first direction A1-A1. Each first grounding elastic arm 415 is provided with a first ground contact portion 4151.

Each second ground sheet 42 includes a second mounting plate 421, a first connecting plate 422 vertically bent downwardly from a front end of the second mounting plate 421, and a plurality of second grounding elastic arms 425 integrally extend backwardly from the first connecting plate 422. The second mounting plate 421 is fixed to the first upper surface 1111 of the first conductive housing 11. In an embodiment of the present disclosure, the second mounting plate 421 and the first conductive housing 11 are fixed together by soldering or welding. In the illustrated embodiment of the present disclosure, the plurality of second grounding elastic arms 425 are spaced apart along the second direction A2-A2. Each second grounding elastic arm 425 extends backwardly in a cantilevered manner along the first direction A1-A1. Each second grounding elastic arm 425 is provided with a second ground contact portion 4251.

In the illustrated embodiment of the present disclosure, corresponding first grounding elastic arm 415 and the second grounding elastic arm 425 are aligned and disposed along the first direction A1-A1. A free end of the first grounding elastic arm 415 and a free end of the second grounding elastic arm 425 overlap with each other so as to increase the grounding area.

The first connecting plate 422 abuts against and at least partially covers a first front surface 210 of the first insulating fixing block 21. The first connecting plate 422 is located at a front end of the receiving slot 101 along the first direction A1-A1. When the mating module 300 is inserted, the tongue plate 301 may be in contact with the first connecting plate 422 first, thereby facilitating the discharge of static electricity. The first grounding elastic arm 415 and the second grounding elastic arm 425 are provided on two sides of the first contact arms 310 of each group of first conductive terminals 31, so as to improve the shielding effect and improve the quality of signal transmission.

Each third ground sheet 43 includes a third mounting plate 431 and a plurality of third grounding elastic arms 435 integrally extending from the third mounting plate 431. In the illustrated embodiment of the present disclosure, the third mounting plate 431 is installed and fixed in the second recess 1218. The third mounting plate 431 defines a plurality of second through holes 4311 that extend through the third mounting plate 431 along the third direction A3-A3 so as to facilitate fixation with the second conductive housing 12 through soldering or welding. In the illustrated embodiment of the present disclosure, the plurality of third grounding elastic arms 435 are spaced apart along the second direction A2-A2. Each third grounding elastic arm 435 extends forwardly in a cantilevered manner along the first direction A1-A1. Each third grounding elastic arm 435 is provided with a third ground contact portion 4351.

Each fourth ground sheet 44 includes a fourth mounting plate 441, a second connecting plate 442 vertically bent upwardly from a front end of the fourth mounting plate 441, and a plurality of fourth grounding elastic arms 445 integrally extend backwardly from the second connecting plate 442. The fourth mounting plate 441 is fixed to the second lower surface 1212 of the second conductive housing 12. In one embodiment of the present disclosure, the fourth mounting plate 441 and the second conductive housing 12 are fixed together by soldering or welding. In the illustrated embodiment of the present disclosure, the plurality of fourth grounding elastic arms 445 are spaced apart along the second direction A2-A2. Each fourth grounding elastic arm 445 extends backwardly in a cantilevered manner along the first direction A1-A1. Each fourth ground elastic arm 445 is provided with a fourth ground contact portion 4451.

In the illustrated embodiment of the present disclosure, corresponding third grounding spring arm 435 and the fourth grounding spring arm 445 are aligned and disposed along the first direction A1-A1. A free end of the third grounding elastic arm 435 and a free end of the fourth grounding elastic arm 445 overlap each other so as to increase the grounding area.

The second connecting plate 442 abuts against and at least partially covers a second front surface 220 of the second insulating fixing block 22. The second connecting plate 442 is located at the front end of the receiving slot 101 along the first direction A1-A1. When the mating module 300 is inserted, the tongue plate 301 may be in contact with the second connecting plate 442 first, thereby facilitating the discharge of static electricity. The third grounding elastic arm 435 and the fourth grounding elastic arm 445 are provided on two sides of the second contact arms 320 of each group of second conductive terminals 32, so as to improve the shielding effect and improve the quality of signal transmission.

Figure 5:
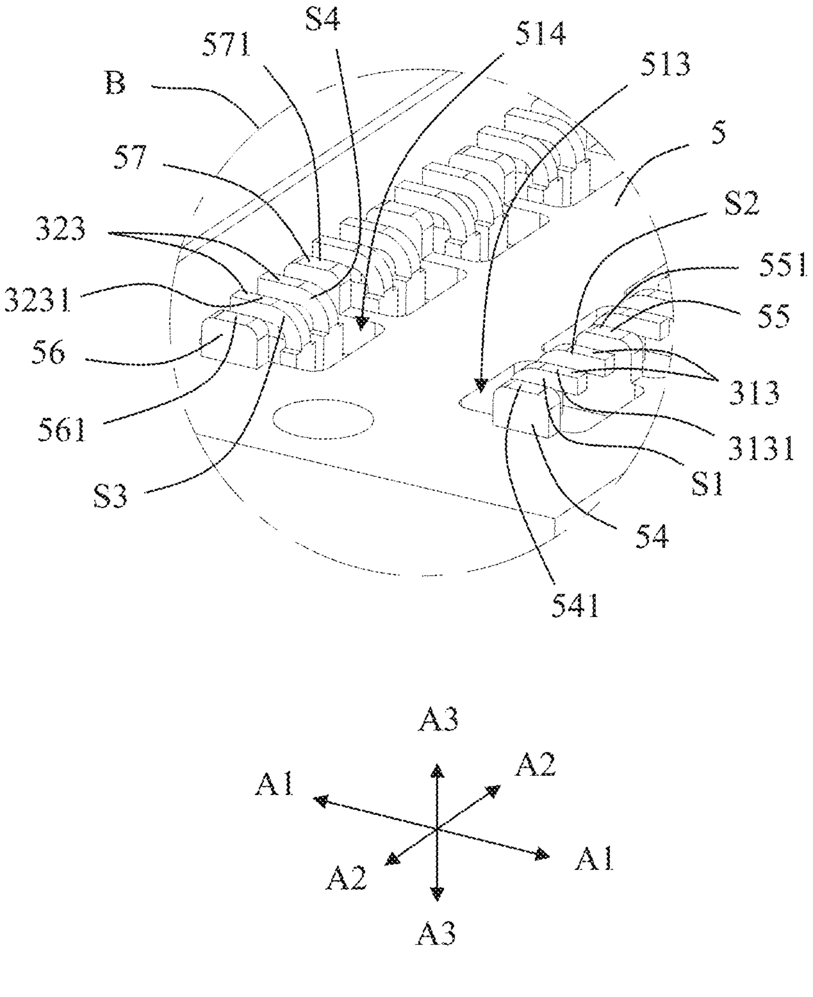
FIG. 5 is a partial enlarged view of a circled part B in FIG. 2.
Figure 6:
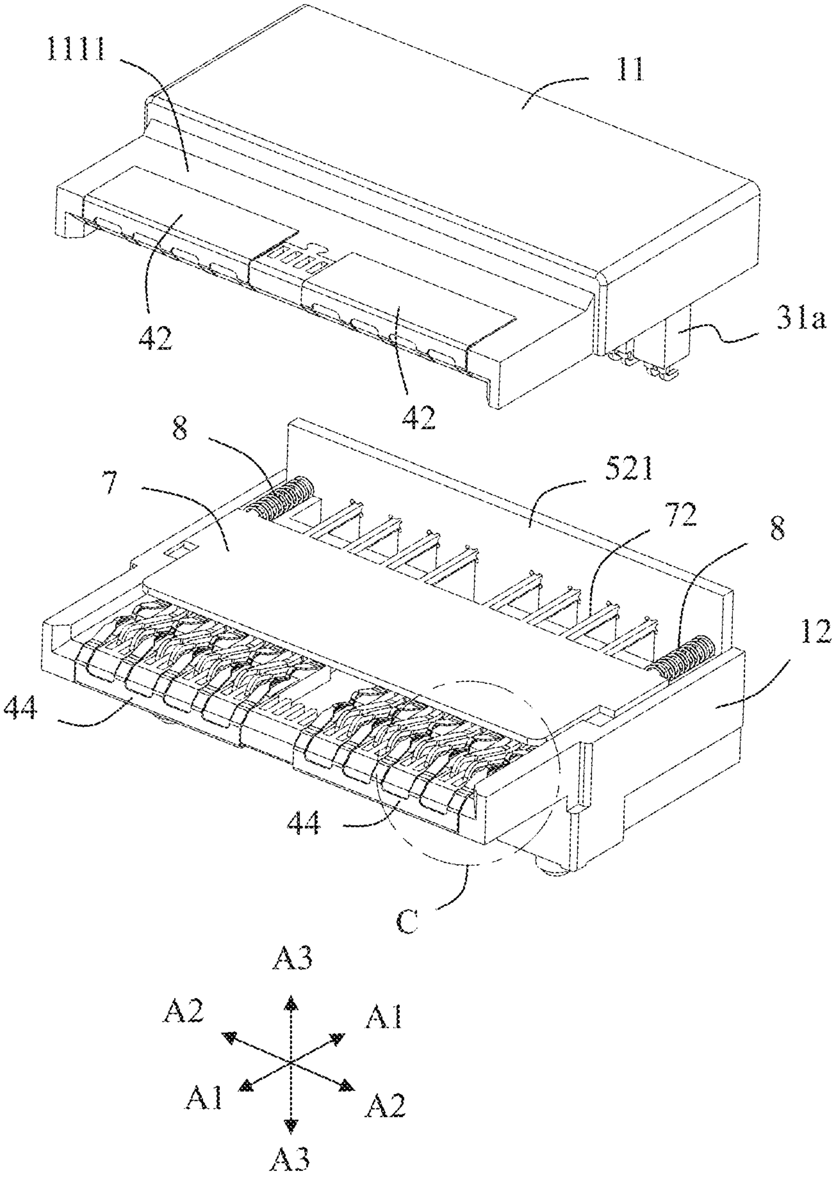
FIG. 6 is a partially exploded perspective view of the electrical connector of the present disclosure.
Figure 7:
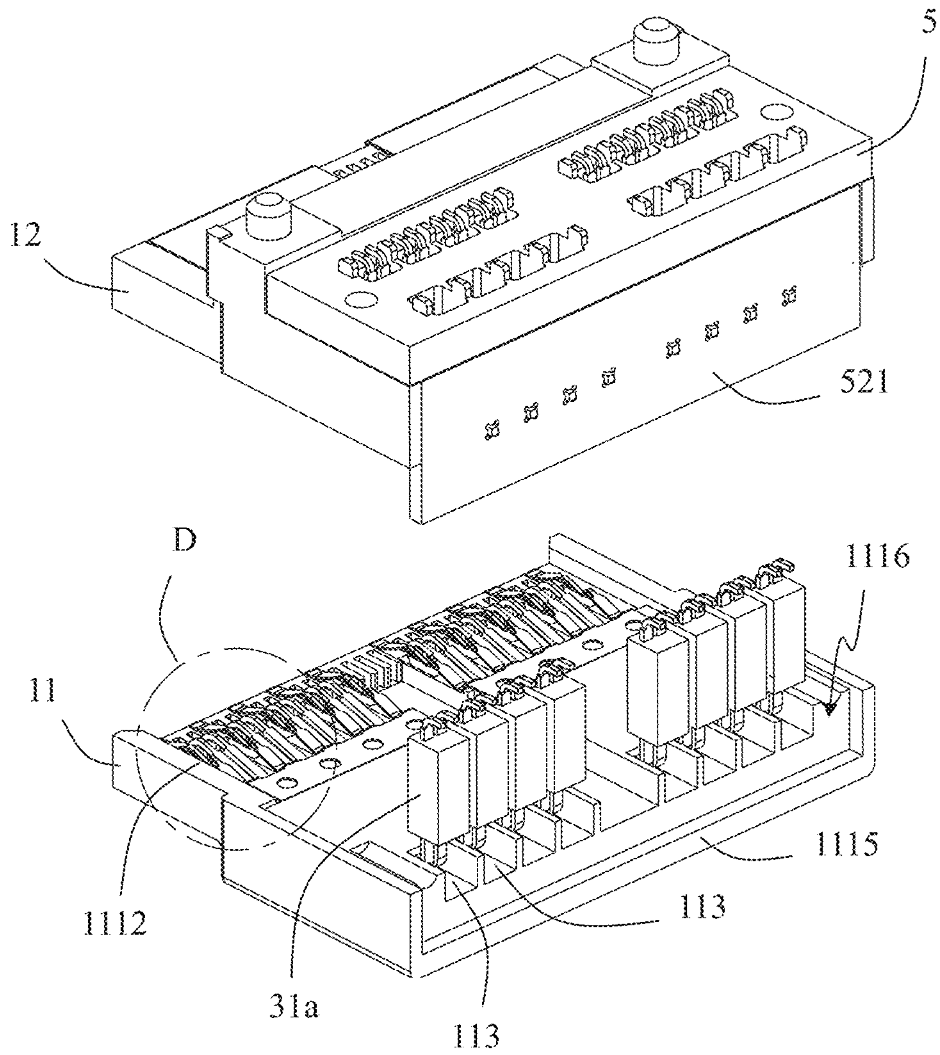
FIG. 7 is a partially exploded perspective view of FIG. 6 from another angle.
Figure 8:
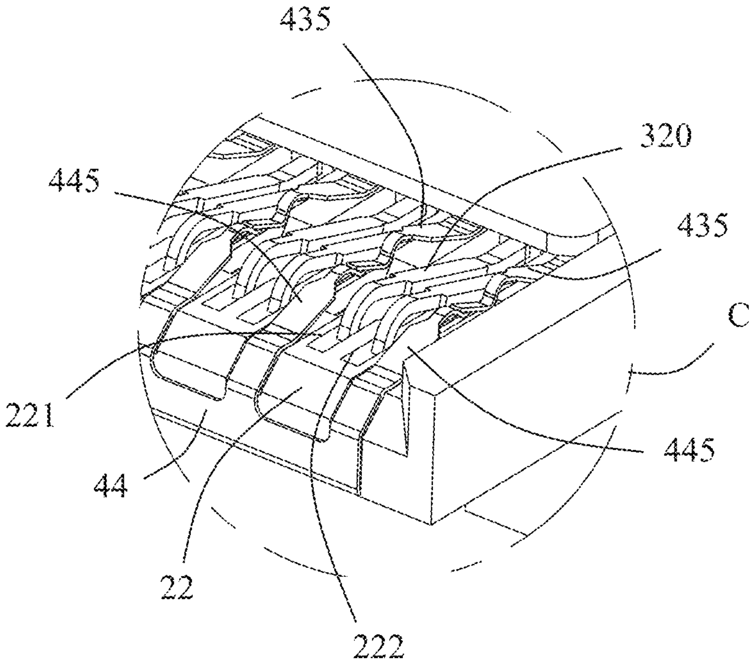
FIG. 8 is a partial enlarged view of a circled part C in FIG. 6.
Figure 9:
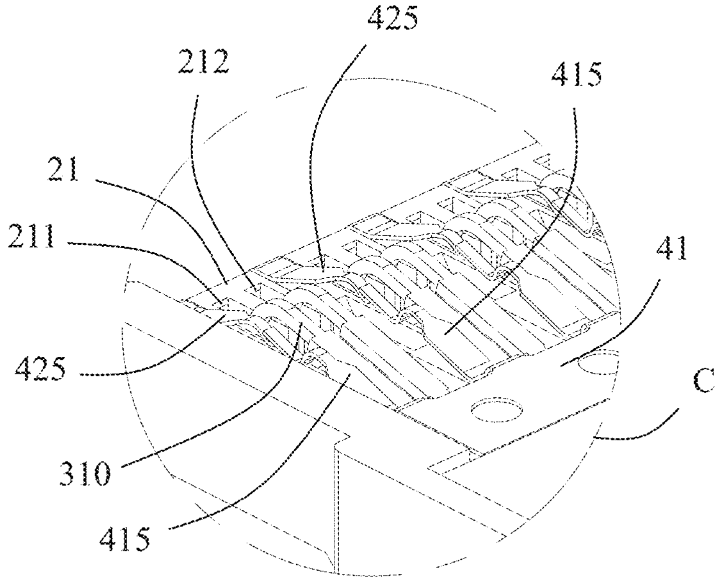
FIG. 9 is a partial enlarged view of a circled part D in FIG. 7.
Figure 10:
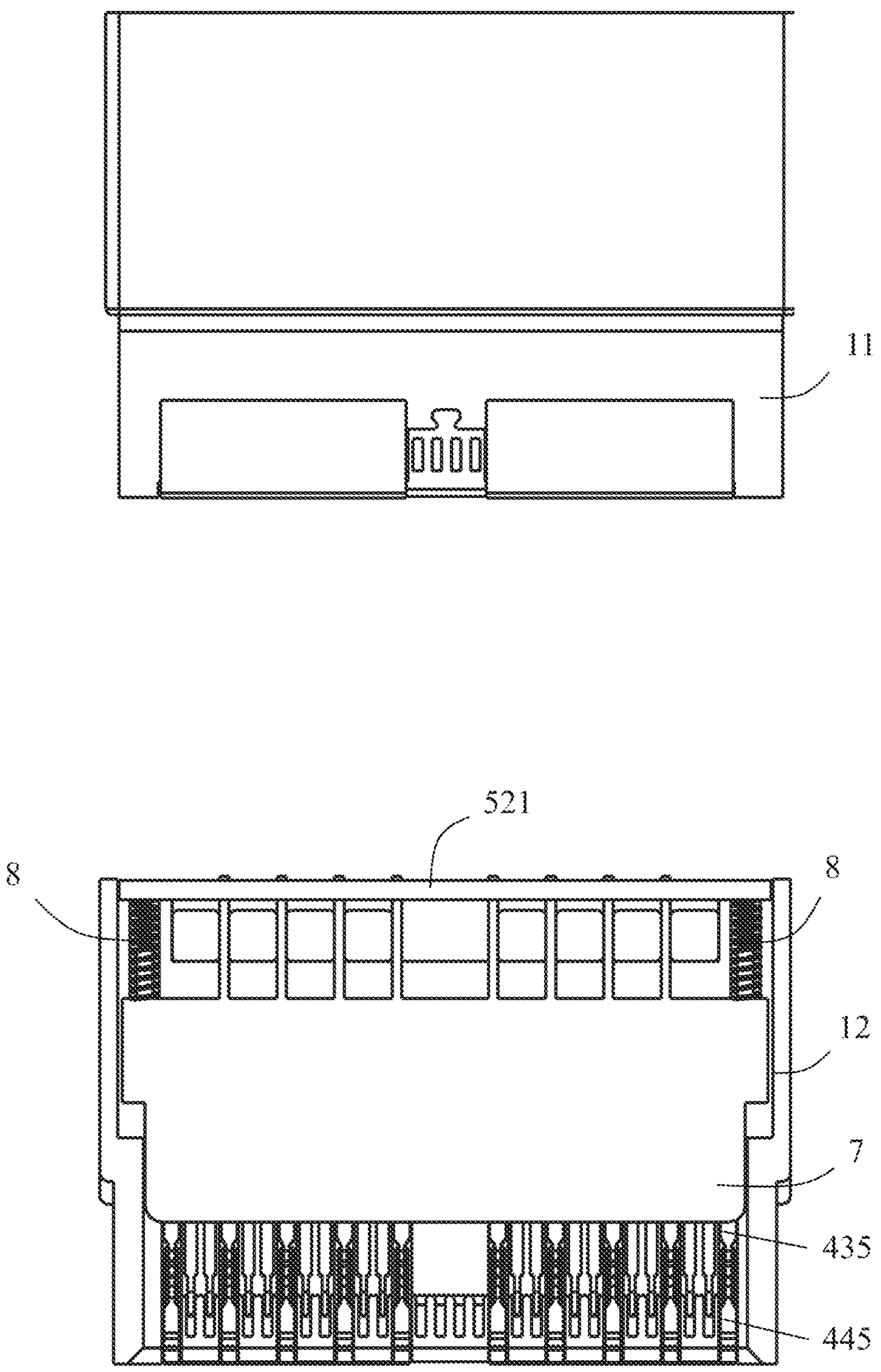
FIG. 10 is a top view of FIG. 6.
Figure 11:
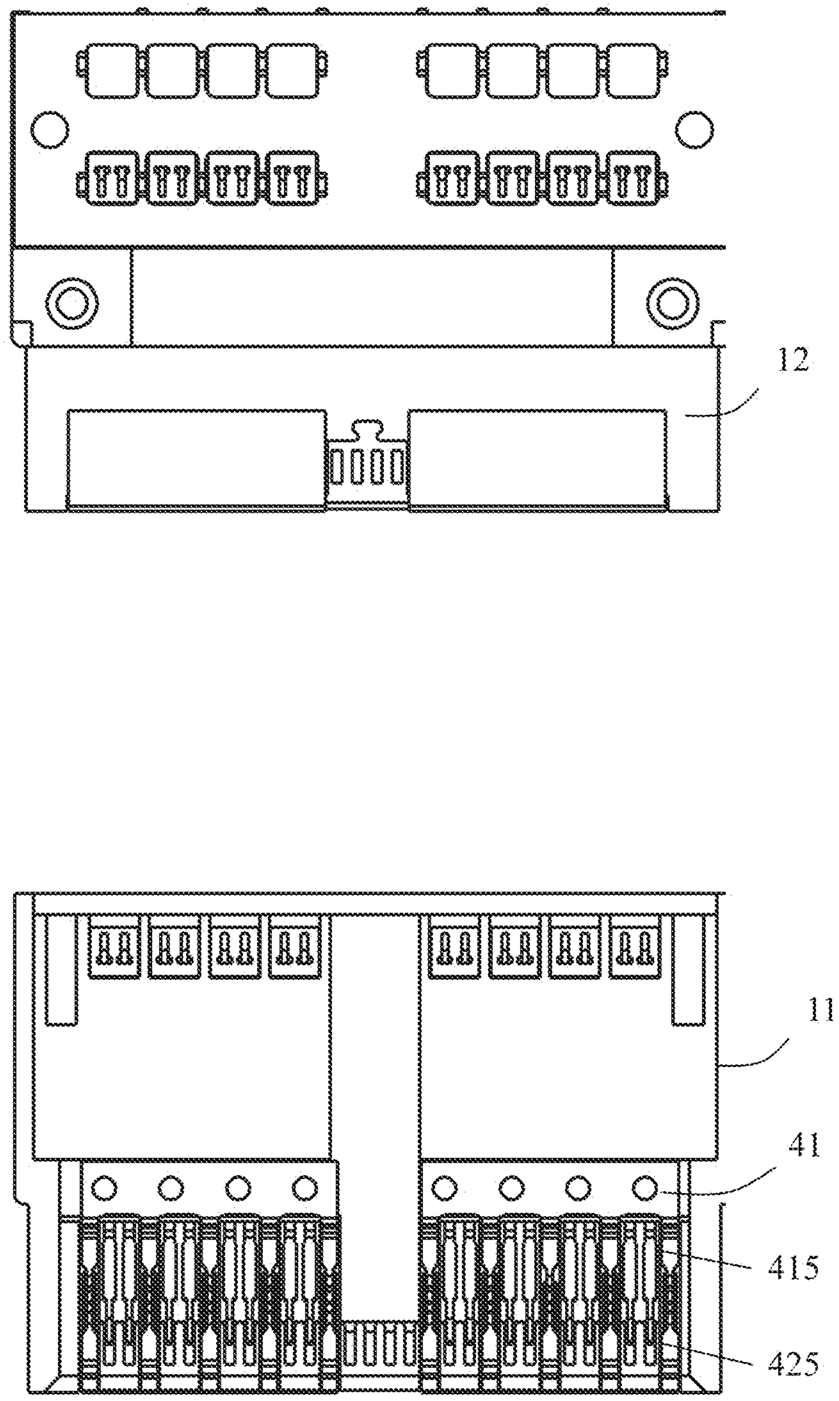
FIG. 11 is a bottom view of FIG. 6.
Figure 12:
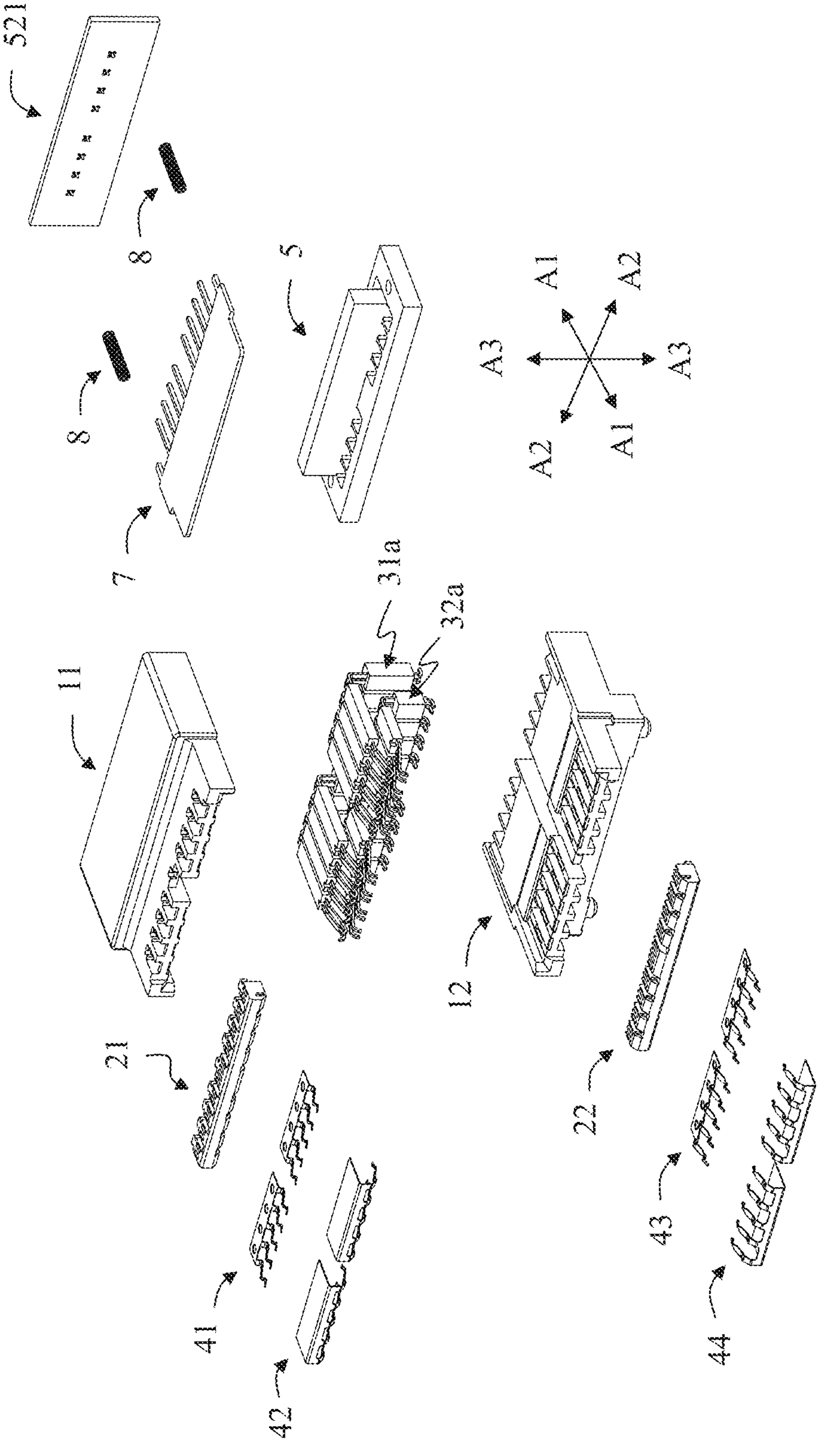
FIG. 12 is an exploded perspective view of the electrical connector in accordance with the embodiment of the present disclosure.
Figure 13:
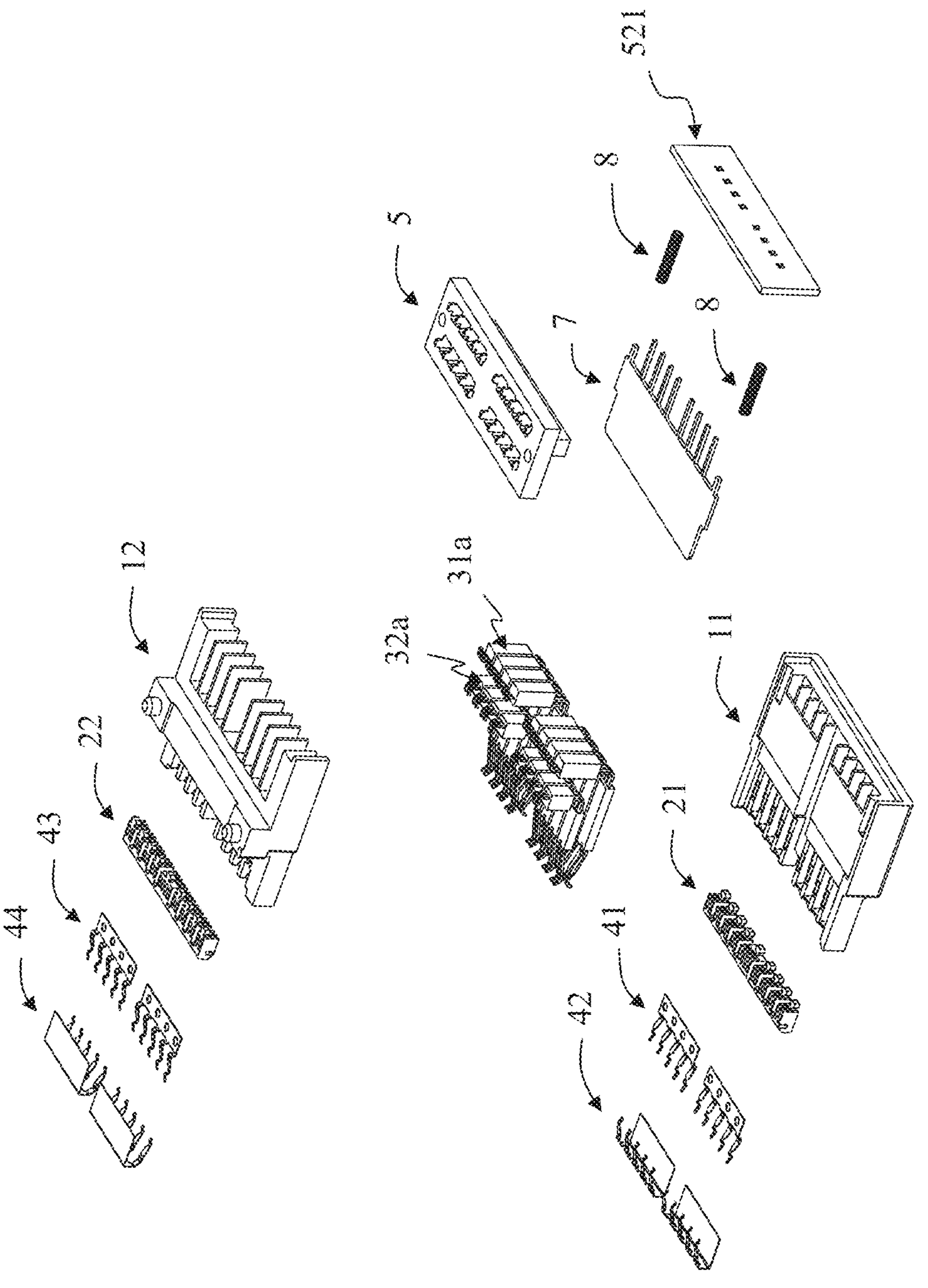
FIG. 13 is an exploded perspective view of FIG. 12 from another angle.
Figure 14:
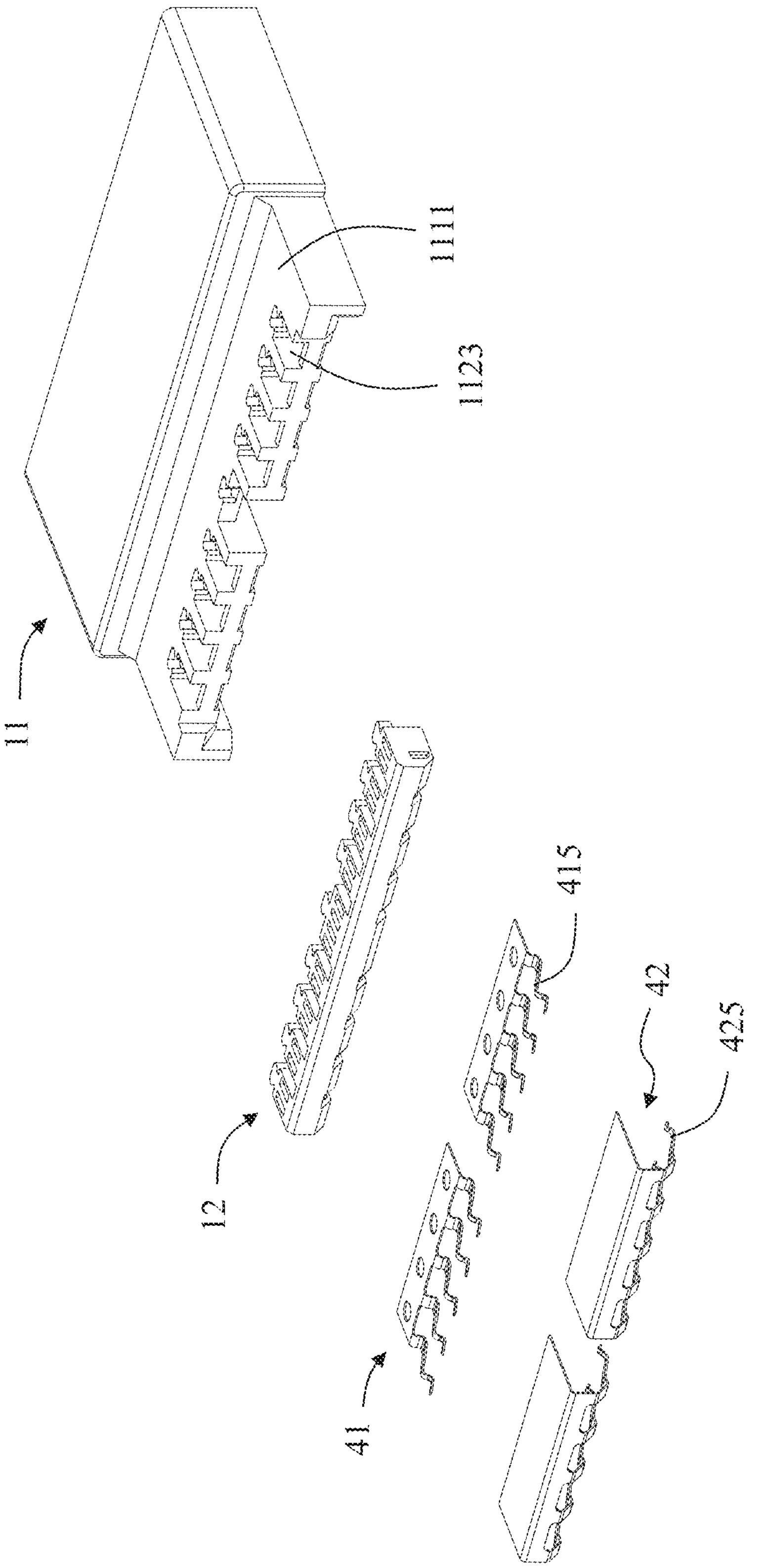
FIG. 14 is an exploded perspective view of a first ground sheet, a second ground sheet, a first insulating fixing block and a first conductive housing.
Figure 21:
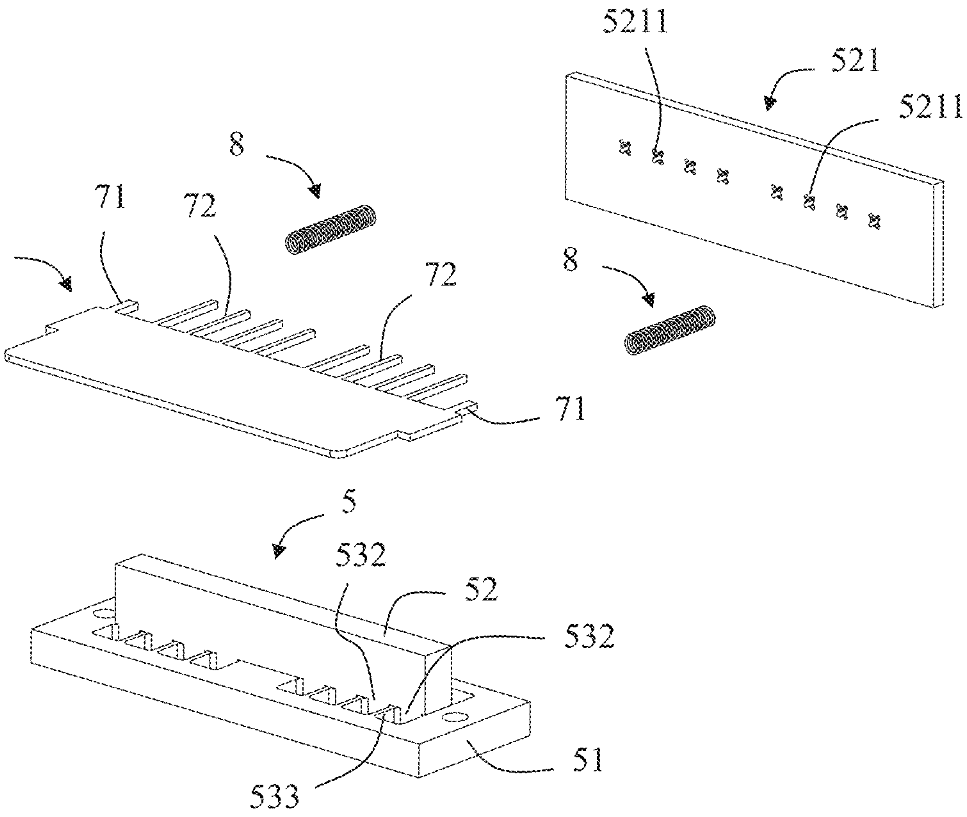
FIG. 21 is a perspective schematic view of a mounting block, an isolation shielding plate, compression springs and a back plate.
Figure 22:
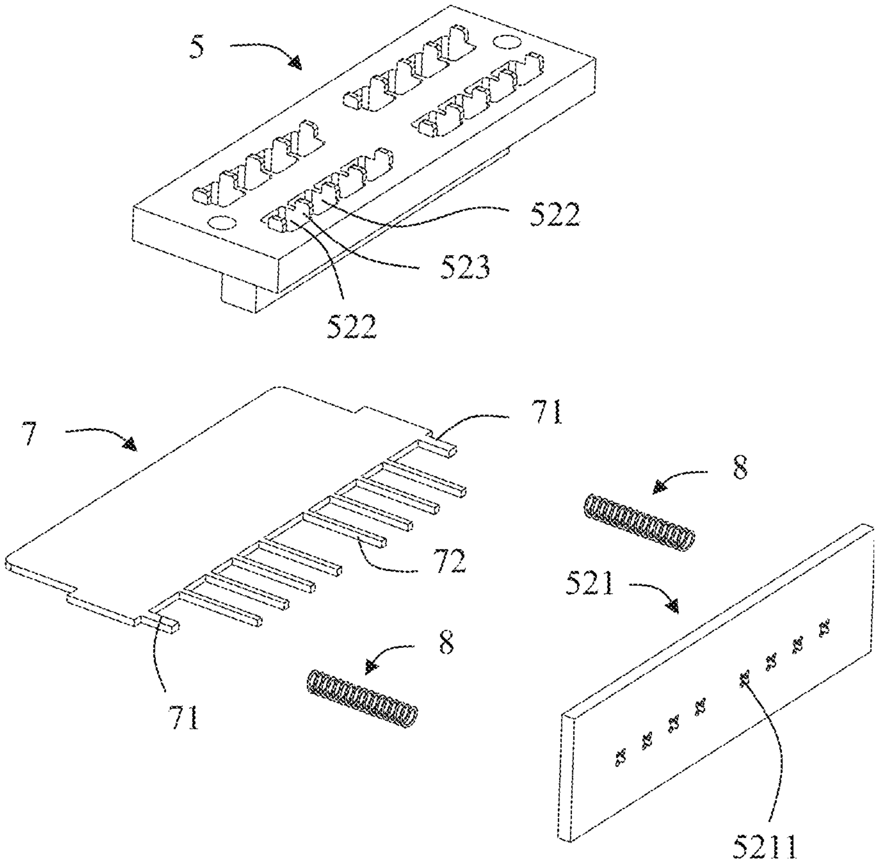
FIG. 22 is a perspective view of FIG. 21 from another angle.

Referring to FIG. 5, FIG. 21 and FIG. 22, in an embodiment of the present disclosure, the mounting block 5 includes a base 51, a convex block 52 extending upwardly from a middle portion of the base 51, a plurality of first receiving grooves 522 extending through the base 51 along the third direction A3-A3, and a plurality of second receiving grooves 532 extending through the base 51 along the third direction A3-A3. The base 51 has a top surface 511 and a bottom surface 512. The convex block 52 protrudes upwardly from the top surface 511 of the base 51. The first receiving grooves 522 are located on one side of the convex block 52, and the second receiving grooves 532 are located on the other side of the convex block 52. The base 51 further includes a plurality of third partition walls 523 of which each separates adjacent first receiving grooves 522, and a plurality of fourth partition walls 533 of which each separates adjacent second receiving grooves 532. The first receiving groove 522 is used to receive the second fixing block 332 so that the second fixing portion 312 of the first conductive terminal 31 is arranged overhead in the first receiving groove 522. With such arrangement, on the one hand, the shielding effect on the first conductive terminal 31 is improved: on the other hand, a short circuit caused by the contact between the second fixing portion 312 and the mounting block 5 is avoided.

The second receiving groove 532 is used to receive the fourth fixing block 342 so that the fourth fixing portion 322 of the second conductive terminal 32 is arranged overhead in the second receiving groove 532. With such arrangement, on the one hand, the shielding effect on the second conductive terminal 32 is improved, and on the other hand, a short circuit caused by the contact between the fourth fixing portion 322 and the mounting block 5 is avoided.

In one embodiment of the present disclosure, the base 51 further defines a plurality of first through holes 513 and a plurality of second through holes 514 which extend through the top surface 511 and the bottom surface 512. Each first through hole 513 is used to allow the first mounting feet 313 of the first signal terminal S1 and the second signal terminal S2 of a corresponding first terminal module 31*a* to pass through. Each second through hole 514 is used to allow the second mounting feet 323 of the third signal terminal S3 and the fourth signal terminal S4 in a corresponding second terminal module 32*a* to pass through. The first mounting foot 313 and the second mounting foot 323 are configured for being mounted to the circuit board.

Referring to FIG. 5, in an embodiment of the present disclosure, in order to improve the shielding of the first mounting feet 313 and the second mounting feet 323, the electrical The connector 100 further includes a plurality of first shielding ribs 54, a plurality of second shielding ribs 55, a plurality of third shielding ribs 56 and a plurality of fourth shielding ribs 57. In an embodiment of the present disclosure, the plurality of first shielding ribs 54, the plurality of second shielding ribs 55, the plurality of third shielding ribs 56 and the plurality of fourth shielding ribs 57 are all provided on the mounting block 5 and protrude downwardly from the bottom surface 512 of the base 51. Each first through hole 513 is associated with one first shielding rib 54 and one second shielding rib 55 on two sides thereof, respectively, so as to better shield the first mounting feet 313 of a group of the first signal terminal S1 and the second signal terminal S2 in first terminal module 31*a*, thereby improving the quality of signal transmission. Each second through hole 514 is associated with one third shielding rib 56 and one fourth shielding rib 57 on two sides thereof, respectively, so as to better shield the second mounting feet 323 of a group of the third signal terminal S3 and the fourth signal terminal S4 in the second terminal module 32*a*, thereby improving the quality of signal transmission.

In an embodiment of the present disclosure, the first shielding rib 54, the second shielding rib 55, the third shielding rib 56 and the fourth shielding rib 57 are all integrally formed with the base 51. Of course, in other embodiments, the first shielding rib 54, the second shielding rib 55, the third shielding rib 56 and the fourth shielding rib 57 can also be made separately from the base 51, and then assembled and fixed to the base 51.

As shown in FIG. 5, in an embodiment of the present disclosure, the first shielding ribs 54 and the third shielding ribs 56 are disposed at intervals along the first direction A1-A1. The second shielding ribs 55 and the fourth shielding ribs 57 are disposed at intervals along the first direction A1-A1. The first shielding rib 54 and the third shielding rib 56 are aligned along the first direction A1-A1. The second shielding rib 55 and the fourth shielding rib 57 are aligned along the first direction A1-A1.

The first shielding rib 54 includes a first lower mounting surface 541. The second shielding rib 55 includes a second lower mounting surface 551. The third shielding rib 56 includes a third lower mounting surface 561. The fourth shielding rib 57 includes a fourth lower mounting surface 571. The first mounting foot 313 includes a first lower contact surface 3131. The second mounting foot 323 includes a second lower contact surface 3231. In order to improve the reliability of contact, in the illustrated embodiment of the present disclosure, the first lower mounting surface 541, the second lower mounting surface 551, the third lower mounting surface 561, the fourth lower mounting surface 571, the first lower contact surface 3131 and the second lower contact surface 3231 are all coplanar.

Figure 23:
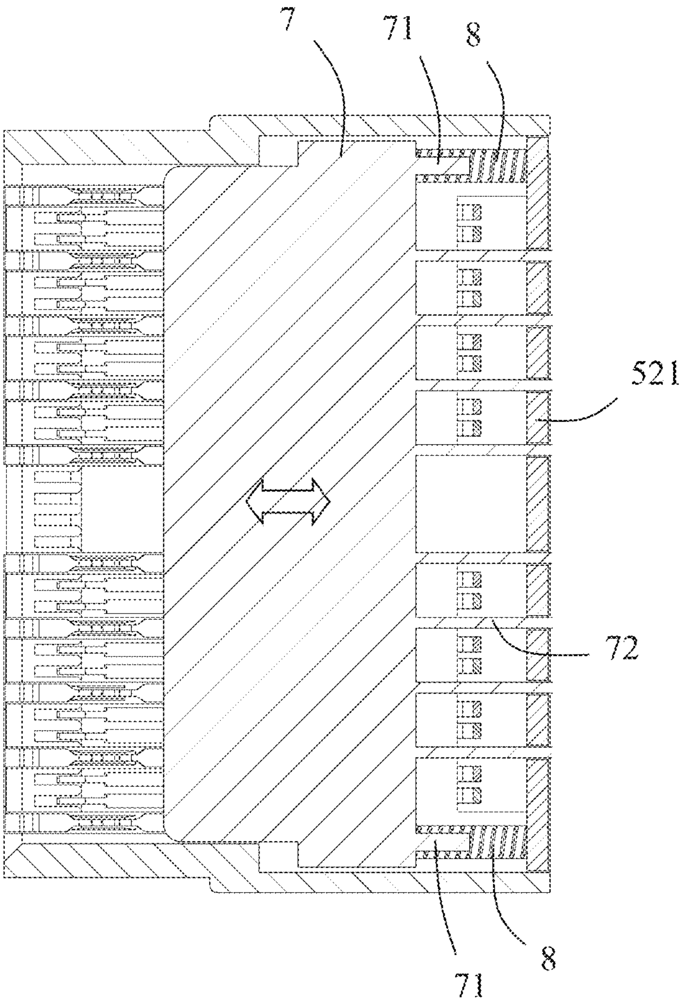
FIG. 23 is a schematic cross-sectional view taken along line E-E in FIG. 1.

Referring to FIGS. 21 to 23, in the illustrated embodiment of the present disclosure, the electrical connector 100 further includes an isolation shielding plate 7. The isolation shielding plate 7 is located between the first conductive terminals 31 and the second conductive terminals 32 to reduce signal crosstalk. In the illustrated embodiment of the present disclosure, the isolation shielding plate 7 is configured to move back and forth along the first direction A1-A1 to adjust the shielding position. In the illustrated embodiment of the present disclosure, the isolation shielding plate 7 is a metal plate to improve shielding.

In the illustrated embodiment of the present disclosure, the electrical connector 100 includes an elastic element that abuts against the isolation shielding plate 7. In an embodiment of the present disclosure, the elastic element is a compression spring 8.

The isolation shielding plate 7 includes at least one protruding rod 71 protruding backwardly and a plurality of positioning rods 72 protruding backwardly. The electrical connector 100 is further provided with a back plate 521. The back plate 521 is installed in the first mounting groove 1116. The back plate 521 shields the second fixing portions 312 of the first conductive terminals 31 and the fourth fixing portions 322 of the second conductive terminals 32 so as to form shielding isolation from the outside. In one embodiment of the present disclosure, the back plate 521 is a metal shell made of metal material, so as to further improve the shielding effect and improve the quality of signal transmission. In another embodiment of the present disclosure, the back plate 521 may also be a composite shell formed by electroplating a metal material on an insulating material. The composite shell can also improve the shielding effect and improve the quality of signal transmission. As shown in FIG. 21 and FIG. 22, in one embodiment of the present disclosure, the back plate 521 and the mounting block 5 are two independent components.

In the illustrated embodiment of the disclosure, two protruding rods 71 are provided and located on two sides of the isolation shielding plate 7. Correspondingly, two compression springs 8 are provided and they are respectively sleeved on corresponding protruding rods 71. One end of each compression spring 8 is sleeved on a corresponding protruding rod 71; and the other end of the compression spring 8 abuts against a front surface of the back plate 521.

The back plate 521 define a plurality of through holes 5211. The positioning rods 72 can pass backwardly through the through holes 5211 when the isolation shielding plate 7 moves. In the illustrated embodiment of the present disclosure, the isolation shielding plate 7 is located in a horizontal plane and is located between the first fixing portions 311 of the first conductive terminals 31 and the third fixing portions 321 of the second conductive terminals 32.

When the tongue plate 301 is inserted into the receiving slot 101, the first contact portions 3101 of the first conductive terminals 31 contact the corresponding first contact pads 304; the second contact portions 3201 of the second conductive terminals 32 contact the corresponding second contact pads 305; the grounding bar 307 abuts against the isolation shielding plate 7 along the first direction A1-A1, and pushes the isolation shielding plate 7 to move backwardly.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising: a housing, the housing defining a receiving slot configured to at least partially receive a mating module along a first direction, a first terminal module installation slot communicating with the receiving slot, and a second terminal module installation slot communicating with the receiving slot: a first terminal module, the first terminal module being partially received in the first terminal module installation slot, the first terminal module comprising a plurality of first conductive terminals; each first conductive terminal comprising a first fixing portion and a first contact arm connected to the first fixing portion; the first contact arm comprising a first contact portion protruding into the receiving slot; a second terminal module, the second terminal module being partially received in the second terminal module installation slot, the second terminal module comprising a plurality of second conductive terminals: each second conductive terminal comprising a third fixing portion and a second contact arm connected to the third fixing portion; the second contact arm comprising a second contact portion protruding into the receiving slot, and an elastic element abutting against an isolation shielding plate, the isolation shielding plate being located between the first conductive terminals and the second conductive terminals; the isolation shielding plate being configured to move back and forth along the first direction.

2. The electrical connector according to claim 1, wherein the elastic element is a compression spring: the isolation shielding plate comprises a protruding rod protruding backwardly; one end of the compression spring is sleeved on the protruding rod.

3. The electrical connector according to claim 2, further comprising a back plate, wherein another end of the compression spring abuts against a front surface of the back plate.

4. The electrical connector according to claim 3, wherein the isolation shielding plate comprises a plurality of positioning rods protruding backwardly; the back plate defines a plurality of through holes; the positioning rods pass backwardly through the through holes when the isolation shielding plate moves backwardly.

5. The electrical connector according to claim 2, wherein two protruding rods are provided and located on two sides of the isolation shielding plate; and two compression springs are provided and sleeved on corresponding protruding rods, respectively.

6. The electrical connector according to claim 1, wherein the isolation shielding plate is a metal plate.

7. The electrical connector according to claim 1, wherein the isolation shielding plate is located between the first fixing portion of the first conductive terminal and the third fixing portion of the second conductive terminal.

8. The electrical connector according to claim 1, wherein the housing is a conductive housing;

the conductive housing is a metal housing; or the conductive housing is a composite housing formed by electroplating a metal material on an insulating material.

9. The electrical connector according to claim 8, further comprising an insulating fixing block fixed to the conductive housing; wherein the insulating fixing block is located adjacent to a plug-in end of the receiving slot; the insulating fixing block comprises at least one slit communicating with the receiving slot; an end of the first contact arm extends at least partially into the at least one slit.

10. A connector assembly, comprising a mating module and an electrical connector mating with the mating module: the mating module comprising a tongue plate: the tongue plate comprising an upper surface, a lower surface, a mating end surface, a plurality of first contact pads exposed to the upper surface, a plurality of second contact pads exposed to the lower surface, and a grounding bar exposed to the mating end surface; the electrical connector comprising: a housing, the housing defining a receiving slot configured to at least partially receive a mating module along a first direction, a first terminal module installation slot communicating with the receiving slot, and a second terminal module installation slot communicating with the receiving slot; a first terminal module, the first terminal module being partially received in the first terminal module installation slot; the first terminal module comprising a plurality of first conductive terminals; each first conductive terminal comprising a first fixing portion and a first contact arm connected to the first fixing portion: the first contact arm comprising a first contact portion protruding into the receiving slot: a second terminal module, the second terminal module being partially received in the second terminal module installation slot; the second terminal module comprising a plurality of second conductive terminals; each second conductive terminal comprising a third fixing portion and a second contact arm connected to the third fixing portion; the second contact arm comprising a second contact portion protruding into the receiving slot; and an elastic element abutting against an isolation shielding plate, the isolation shielding plate being located between the first conductive terminals and the second conductive terminals, the isolation shielding plate being configured to move back and forth along the first direction; when the tongue plate is inserted into the receiving slot, the first contact portion of the first conductive terminal contacts a corresponding first contact pad; the second contact portion of the second conductive terminal contacts a corresponding second contact pad; the grounding bar abuts against the isolation shielding plate along the first direction.

11. The connector assembly according to claim 10, wherein the elastic element is a compression spring; the isolation shielding plate comprises a protruding rod protruding backwardly; one end of the compression spring is sleeved on the protruding rod.

12. The connector assembly according to claim 11, wherein the electrical connector further comprises a back plate; wherein another end of the compression spring abuts against a front surface of the back plate.

13. The connector assembly according to claim 12, wherein the isolation shielding plate comprises a plurality of positioning rods protruding backwardly; the back plate defines a plurality of through holes; the positioning rods pass backwardly through the through holes when the isolation shielding plate moves backwardly.

14. The connector assembly according to claim 11, wherein two protruding rods are provided and located on two sides of the isolation shielding plate; and two compression springs are provided and sleeved on corresponding protruding rods, respectively.

15. The connector assembly according to claim 10, wherein the isolation shielding plate is a metal plate.

16. The connector assembly according to claim 10, wherein the isolation shielding plate is located between the first fixing portion of the first conductive terminal and the third fixing portion of the second conductive terminal.

17. The connector assembly according to claim 10, wherein the housing is a conductive housing;

the conductive housing is a metal housing; or the conductive housing is a composite housing formed by electroplating a metal material on an insulating material.

18. The connector assembly according to claim 17, wherein the electrical connector further comprises an insulating fixing block fixed to the conductive housing; the insulating fixing block is located adjacent to a plug-in end of the receiving slot; the insulating fixing block comprises at least one slit communicating with the receiving slot; an end of the first contact arm extends at least partially into the at least one slit.

* * * * *